United States Patent
Fujimoto et al.

(10) Patent No.: US 6,539,115 B2
(45) Date of Patent: *Mar. 25, 2003

(54) PATTERN RECOGNITION DEVICE FOR PERFORMING CLASSIFICATION USING A CANDIDATE TABLE AND METHOD THEREOF

(75) Inventors: Katsuhito Fujimoto, Kawasaki (JP); Hiroshi Kamada, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/922,549

(22) Filed: Sep. 3, 1997

(65) Prior Publication Data
US 2001/0019628 A1 Sep. 6, 2001

(30) Foreign Application Priority Data
Feb. 12, 1997  (JP) ............................................. 9-027521

(51) Int. Cl.⁷ ................................................. G06K 9/62
(52) U.S. Cl. ....................................... 382/225; 382/227
(58) Field of Search .................................. 382/190, 195, 382/197, 198, 173, 219, 224, 225, 226, 227, 228; 707/5, 6; 704/231

(56) References Cited

U.S. PATENT DOCUMENTS

| | | | | |
|---|---|---|---|---|
| 5,287,275 A | * | 2/1994 | Kimura | 382/228 |
| 5,325,445 A | * | 6/1994 | Herbert | 382/225 |
| 5,436,982 A | * | 7/1995 | Kimura | 382/168 |
| 5,508,915 A | * | 4/1996 | Tsao et al. | 364/422 |
| 5,619,709 A | * | 4/1997 | Caid et al. | 395/794 |
| 5,671,293 A | * | 9/1997 | Niki | 382/224 |
| 5,689,584 A | * | 11/1997 | Kobayashi | 382/224 |
| 5,727,093 A | * | 3/1998 | Uchiyama et al. | 382/294 |
| 5,809,180 A | * | 9/1998 | Kimura | 382/288 |

* cited by examiner

Primary Examiner—Yon J. Couso
(74) Attorney, Agent, or Firm—Staas & Halsey LLP

(57) ABSTRACT

The value of a reference feature vector calculated from a feature vector of an input pattern is transformed into a candidate category set, by a mapping described in a candidate table. Then, pattern recognition is performed using the candidate category set. By suitably setting the mapping, a high-speed process is performed while maintaining a recognition accuracy.

32 Claims, 23 Drawing Sheets

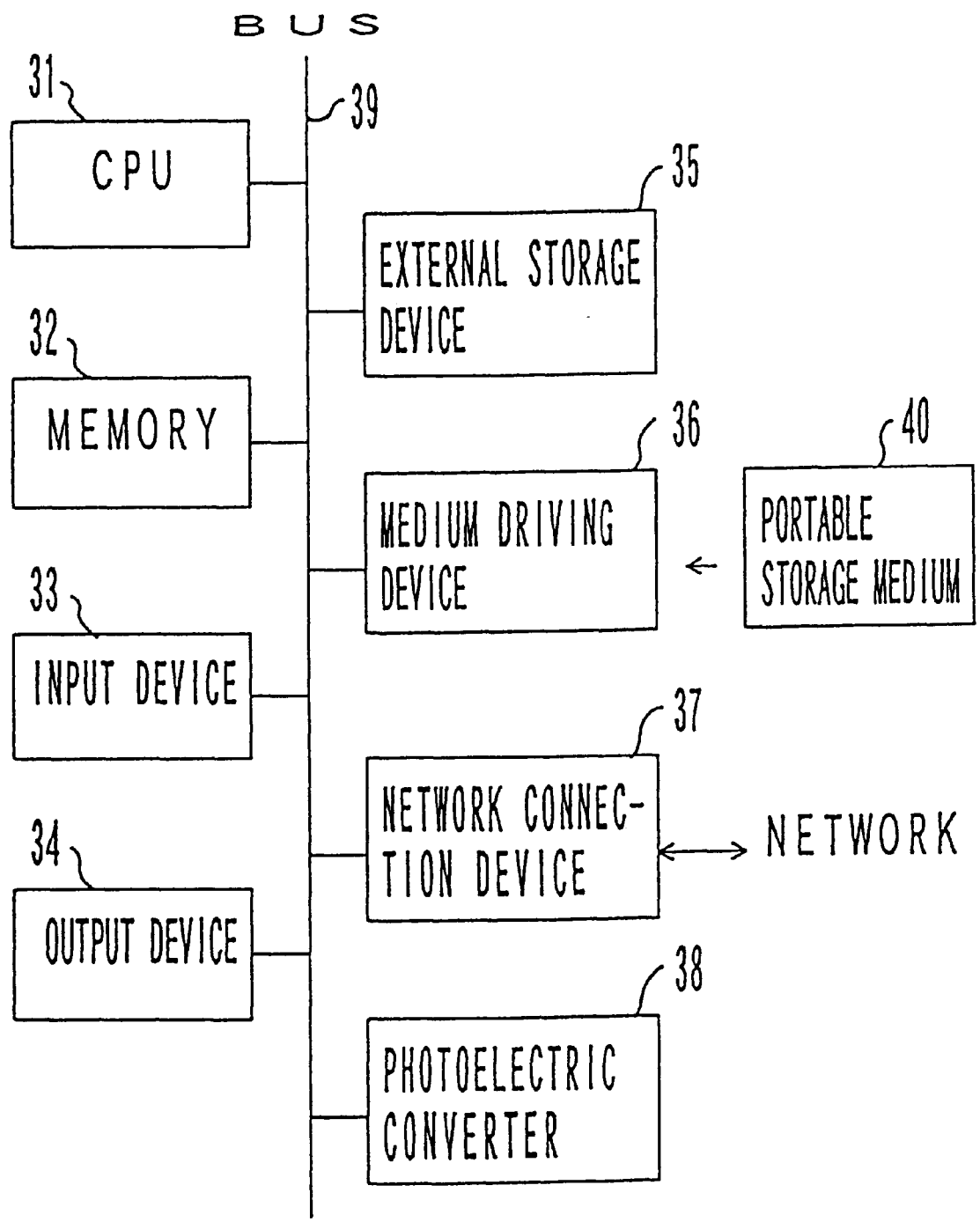
F I G. 4

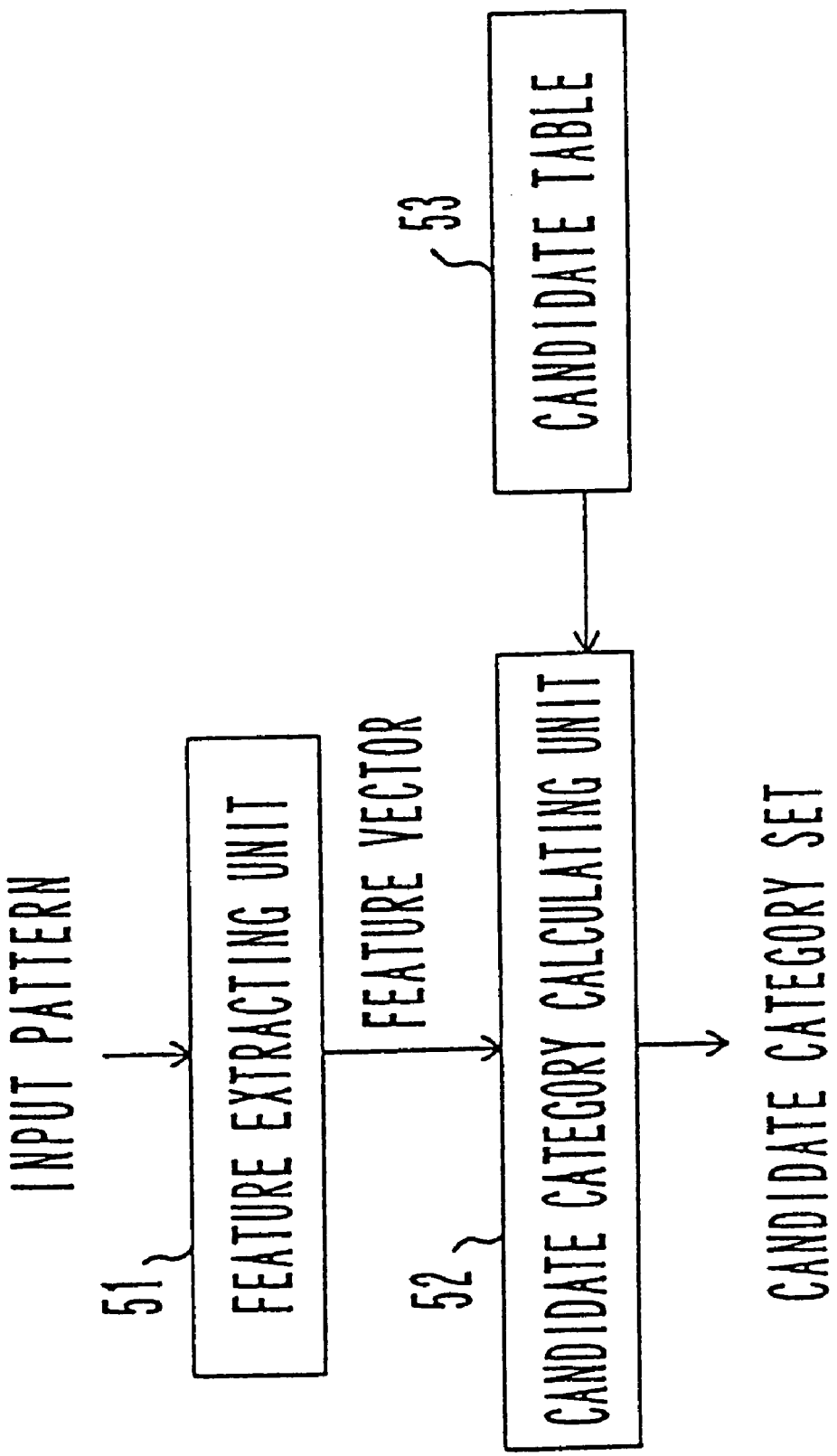
F I G. 7

| REFERENCE FEATURE DIVIDING ELEMENT | CANDIDATE CATEGORY SET |
|---|---|
| $R0 = (-\infty, s0)$ → | (E) |
| $R1 = [s0, s1)$ → | (A, E, F) |
| $R2 = [s1, s2)$ → | (A, B, F, G) |
| $R3 = [s2, s3)$ → | (B, C, G, H, K) |
| $R4 = [s3, s4)$ → | (C, H, I, K, L) |
| $R5 = [s4, s5)$ → | (C, D, I, L) |
| $R6 = [s5, +\infty)$ → | (C, J, M) |

FIG. 9

| REFERENCE FEATURE DIVIDING ELEMENT | CANDIDATE CATEGORY SET |
|---|---|
| ⋮ | ⋮ |
| $X = [s2, s3) \times [t0, t1) \rightarrow$ | $(B, C, K)$ |
| $Y = [s2, s3) \times [t1, t2) \rightarrow$ | $(G, H, K)$ |
| ⋮ | ⋮ |

FIG. 14

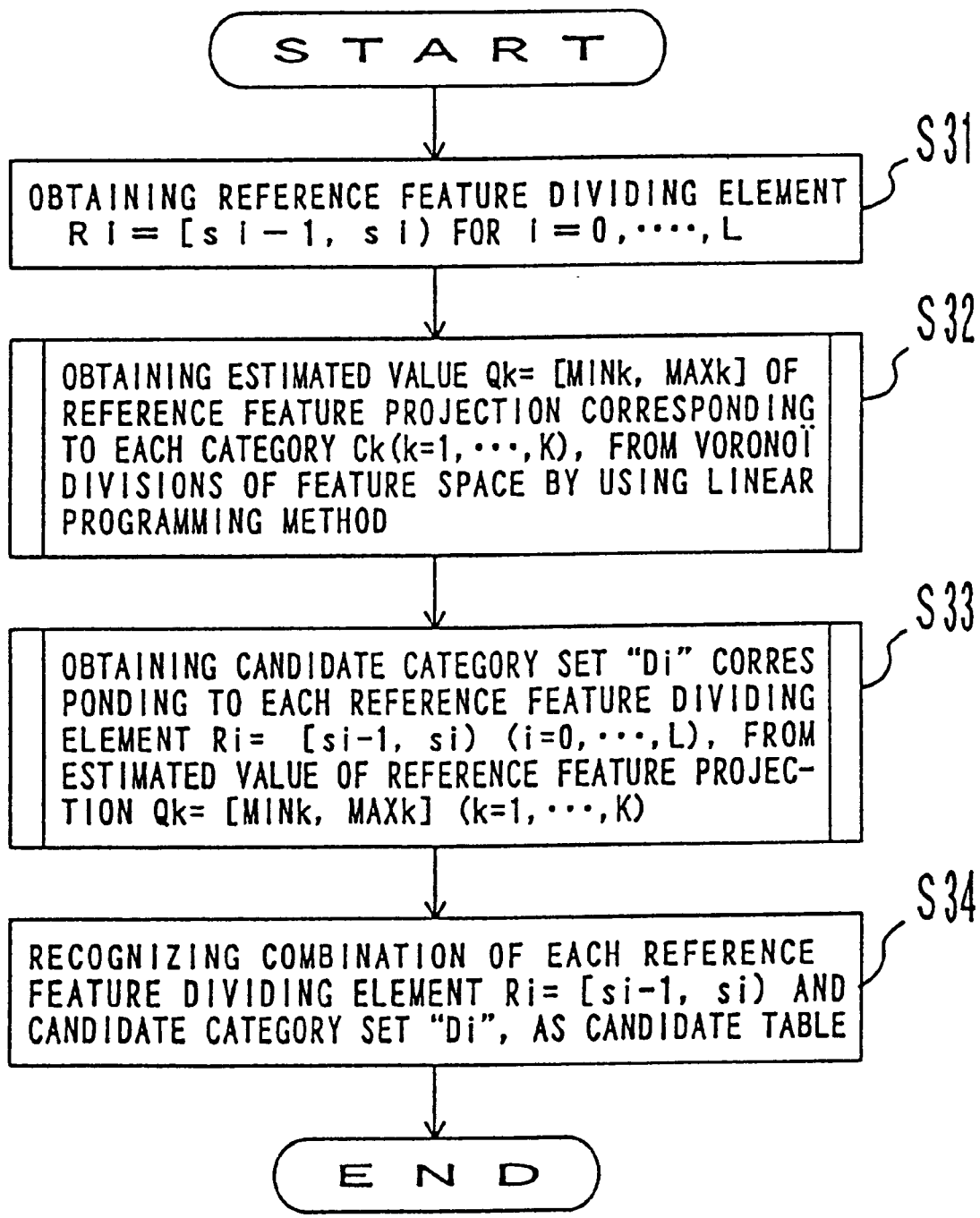
F I G. 1 8

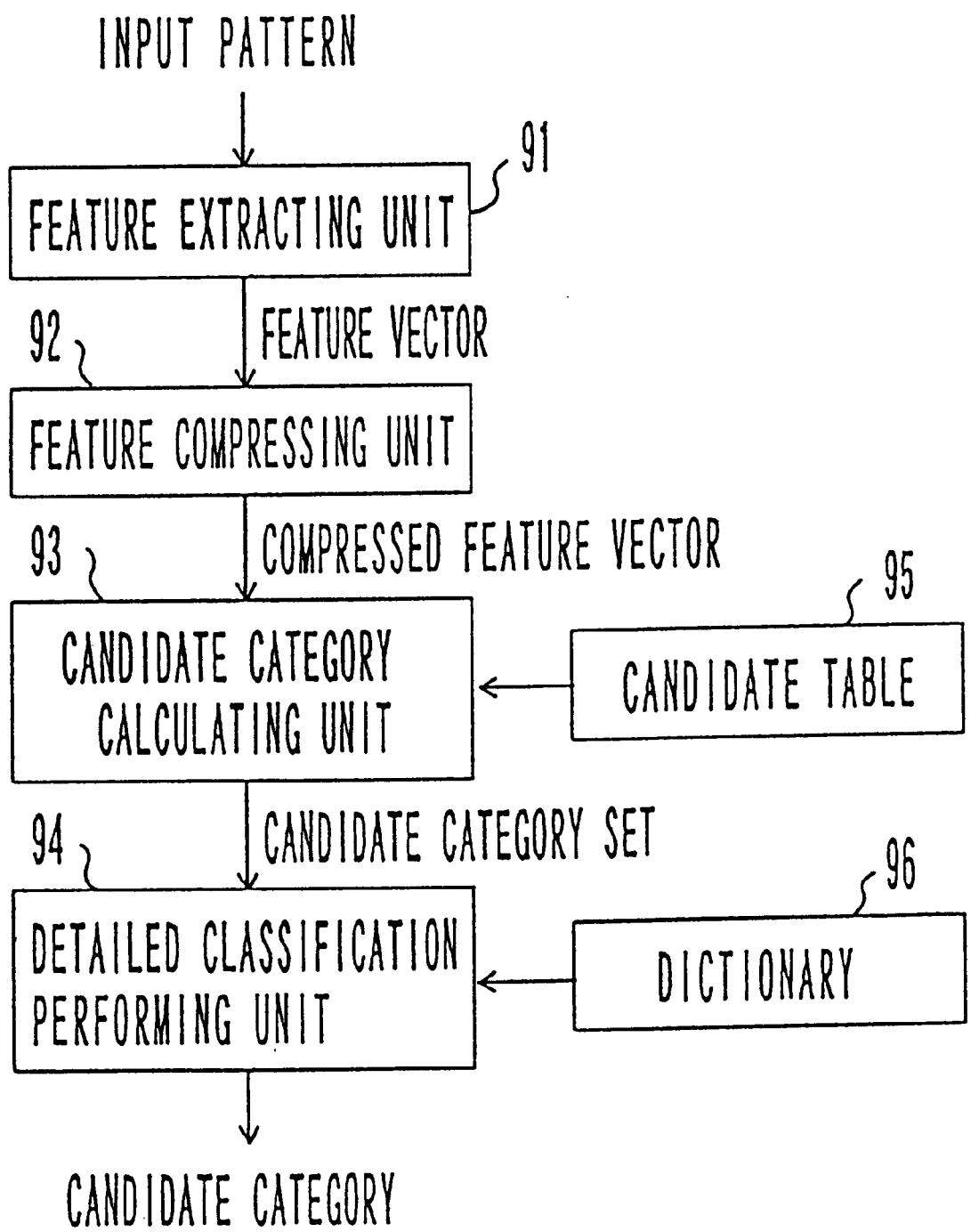
F I G. 2 1

PATTERN RECOGNITION DEVICE FOR PERFORMING CLASSIFICATION USING A CANDIDATE TABLE AND METHOD THEREOF

BACKGROUND OF THE INVENTION

1. Field of the Invention

The present invention relates to pattern recognition, and more particularly to a pattern recognition device for recognizing a pattern by estimating a category to which an input pattern or its feature vector belongs, and a method thereof.

2. Related Art of the Invention

Recently, a system for electronically filing a document, and coding the document depending on need, has been developed in order to make work flow in a company more efficient. Accordingly, there is a strong need for a document recognition device which recognizes low quality documents, such as a faxed document, etc. Especially, a character recognition device is essential for coding printed character string information. For its practical and widespread use, it is vital to estimate a character category at a higher speed while maintaining high recognition accuracy.

Additionally, technology for recognizing a human face becomes more important as a technical element of electronic conferencing and a security system. Human face recognition technology, which allows a human face to be identified in real time at high speed and with high accuracy, is demanded.

As systems such as a computer graphics system, CAD (Computer-Aided Design) system, DTP (Desk Top Publishing) system etc., become popular, a technique for recognizing a three-dimensional object or a two-dimensional graphic object becomes more important as the means for efficiently inputting an actual three-dimensional or two-dimensional object to a computer, and thereby implementing its reuse. Accordingly, the technology for recognizing a real object or a graphic object at high speed and with high accuracy is practically essential for these systems.

As described above, the technology for recognizing a pattern at high speed and with high accuracy plays an important role as a technical element in configuring a variety of types of practical pattern recognition devices. Here, the terms which are frequently used for pattern recognition are briefly defined below.

A recognition target is referred to as a pattern, and a set formed by all patterns is referred to as a pattern space. A combination of one or more feature amounts obtained by extracting a feature from a pattern is referred to as a feature vector. The number of elements of the feature vector is referred to as the dimension of the feature vector.

A combination of the values of elements of a feature vector is referred to as the value of the feature vector. A set formed by all the values of the feature vector is referred to as a feature space. The dimension of the feature space is equal to that of the feature vector, which is the element of the feature space.

A subset of the elements of the feature vector is referred to as a partial feature vector. A combination of the values of respective elements of the partial feature vector is referred to as the value of the partial feature vector. A set formed by all the values of the partial feature vector is referred to as a partial feature space. The dimension of the partial feature space is equal to that of the partial feature vector, which is the element of the partial feature space.

A set of patterns or feature vectors which can be recognized as being an identical type is referred to as a category. Especially, a set of patterns which can be recognized as being an identical type is referred to as a category pattern set, while a set of feature vectors which can be recognized as being an identical type is referred to as a category feature set.

To determine which category (category pattern set or category feature set) an input pattern or feature vector belongs to is referred to as pattern recognition. Especially, if there is a probability that the input pattern or feature vector belongs to a certain category included in a category set, that category set is referred to as a candidate category set.

There is a conventional method for significantly reducing a process time by compressing a feature, and drastically reducing the number of dimensions of a feature vector used for calculating a distance when matching is made, as a fast pattern recognition method. FIG. 1 is a block diagram showing the configuration of such a pattern recognition device employing high-speed classification by compressing a feature.

In the pattern recognition device shown in FIG. 1, a feature extracting unit 1 extracts a feature vector from an input pattern; a feature compressing unit 2 performs linear transformation of the feature vector, and obtains a compressed feature vector whose number of dimensions becomes lower; a compressed feature dictionary 4 includes compressed feature vectors corresponding to respective categories; and a rough classification performing unit 3 obtains the distance between a compressed feature vector obtained by the feature compressing unit 2 and each compressed feature vector in the compressed feature dictionary 4, sorts categories in ascending order of distance, and outputs categories whose number is predetermined, starting from a category whose distance is the shortest, as a candidate category set.

However, the conventional pattern recognition has the following problems.

With pattern recognition using high speed classification by compressing a feature, a loss of information occurs when a feature vector is compressed and transformed into a compressed feature vector whose number of dimensions is lower. Accordingly, a correct candidate category set may not sometimes be obtained. This is because the category, including a compressed feature vector whose distance to a compressed feature vector of the input pattern is the shortest, does not always contain the compressed feature vector of the input pattern. Consequently, the recognition accuracy of an input pattern of low quality is significantly degraded. Also the recognition accuracy of an input pattern of high quality is slightly degraded.

SUMMARY OF THE INVENTION

An object of the present invention is to provide a pattern recognition device which can make the calculation of a candidate category set faster while suppressing the degradation of a recognition accuracy, and a method thereof.

As a first aspect of the present invention, a pattern recognition device comprises a table storing unit and a candidate category calculating unit. The table storing unit stores a candidate table describing the information required for generating a mapping whose input is a value of a reference feature vector calculated from a feature vector of a pattern, and whose output is a candidate category set. The candidate category calculating unit obtains a candidate category set corresponding to a given value of a reference feature vector using the candidate table, and outputs the obtained candidate category set.

The reference feature vector is a feature vector referenced by the candidate category calculating unit. For example, a partial feature vector composed of part of the elements of the feature vector is used as the reference feature vector.

As a second aspect of the present invention, a pattern recognition device comprises a plurality of table storing units, a plurality of candidate category calculating units, and a category screening unit. Each of the plurality of table storing units stores a candidate table describing the information required for generating a mapping whose input is a value of a reference feature vector calculated from a feature vector of a pattern, and whose output is a candidate category set.

The candidate category calculating unit is arranged for each of the plurality of table storing units, obtains a candidate category set corresponding to a value of a given reference feature vector using a candidate table, and outputs the obtained candidate category set. The category screening unit screens a plurality of candidate category sets output from a plurality of candidate category calculating units and outputs a result of the screening.

As a third aspect of the present invention, a pattern recognition device comprises a storing unit and a candidate category calculating unit. The storing unit stores a correspondence between feature amount data indicating a feature of a pattern and a candidate category set. The candidate category calculating unit obtains a candidate category set corresponding to given feature amount data by using the correspondence, and outputs the obtained candidate category set.

BRIEF DESCRIPTION OF THE DRAWINGS

FIG. 4 is a block diagram showing the configuration of an information processing device;

FIG. 7 is a schematic diagram showing the configuration of a second pattern recognition device;

FIG. 9 exemplifies a first candidate table;

FIG. 14 exemplifies a second candidate table;

FIG. 18 is a flowchart showing a process for generating a candidate table using Voronoï divisions;

FIG. 21 is a schematic diagram showing the configuration of a fifth pattern recognition device.

DESCRIPTION OF THE PREFERRED EMBODIMENTS

Figure 1:
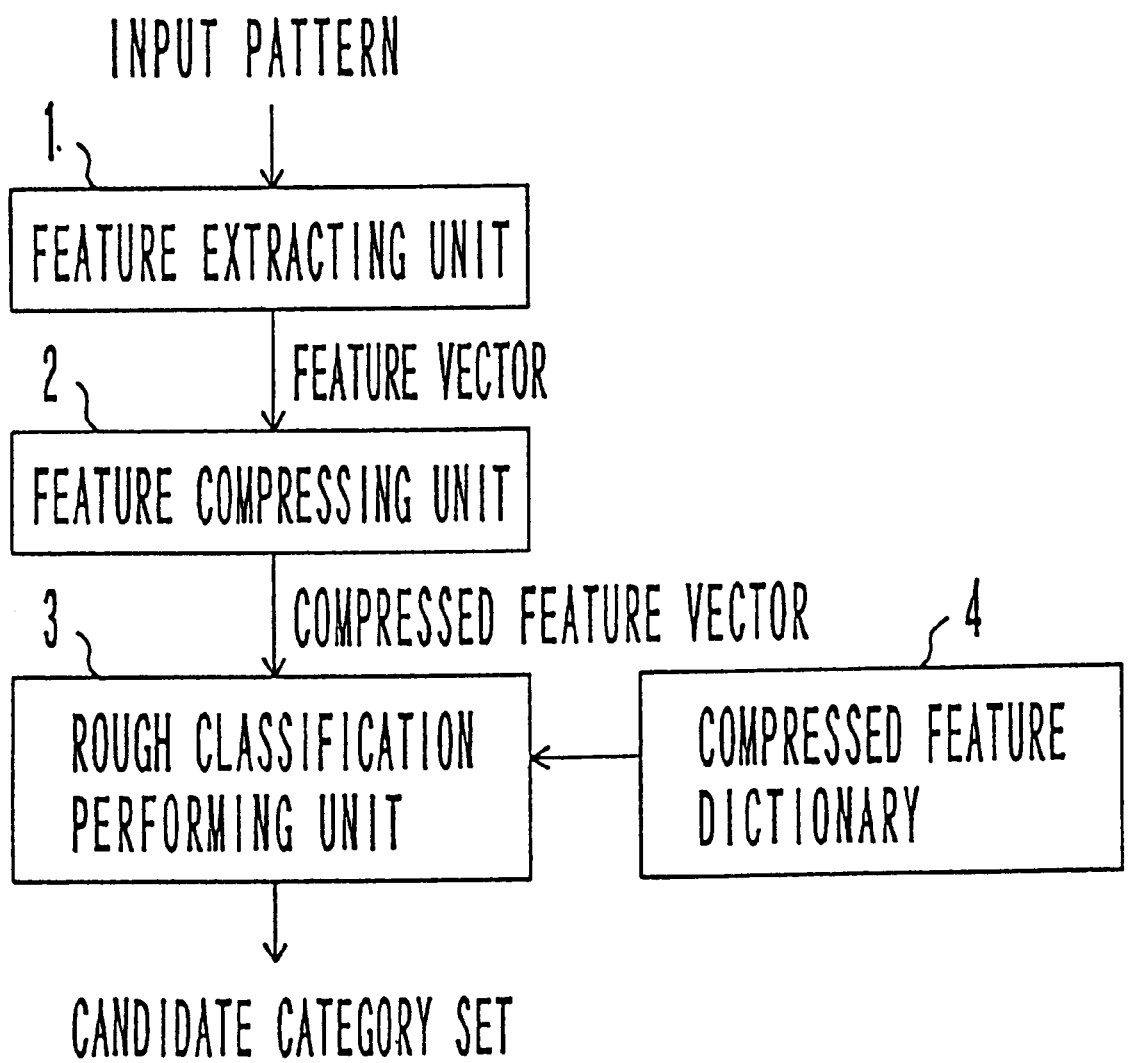
FIG. 1 is a schematic diagram showing the configuration of a conventional pattern recognition device.

Provided below is the explanation about the details of the embodiments according to the present invention, by referring to the drawings.

Figure 2:
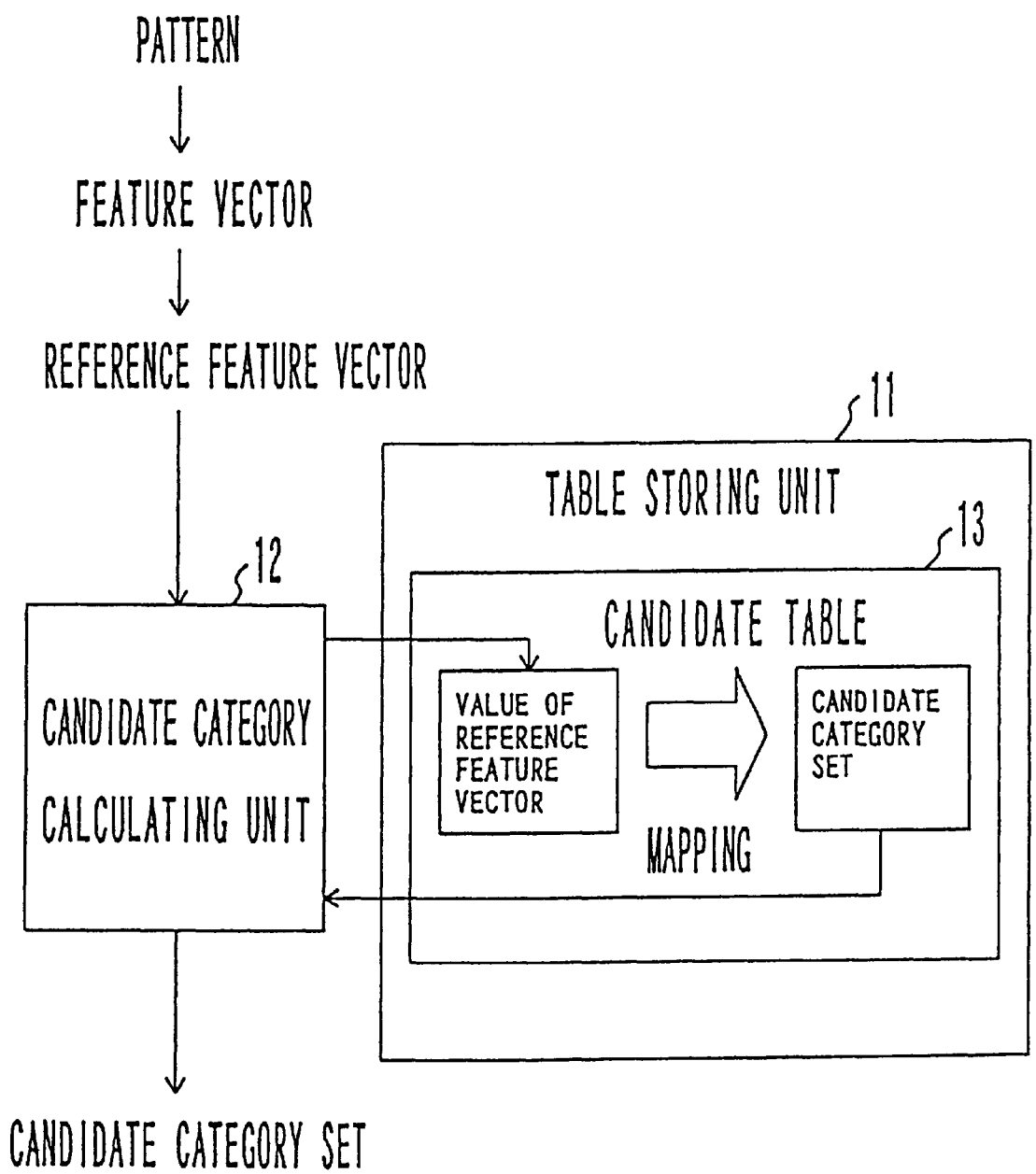
FIG. 2 is a schematic diagram showing the principle of a pattern recognition device according to the present invention.

FIG. 2 is a schematic diagram showing the principle of a pattern recognition device according to the present invention. The device shown in FIG. 2 comprises a table storing unit 11 and a candidate category calculating unit 12.

The table storing unit 11 stores a candidate table 13 describing the information required for generating a mapping whose input is a value of a reference feature vector calculated from a feature vector of a pattern, and whose output is a candidate category set.

The candidate category calculating unit 12 obtains a candidate category set corresponding to the value of a given reference feature vector using the candidate table 13, and outputs the obtained candidate category set.

The reference feature vector is a feature vector referenced by the candidate category calculating unit 12. The number of elements of the reference feature vector is referred to as the dimension of the reference feature vector. A set of values of reference feature vectors is referred to as a reference feature space. The dimension of the reference feature space is equal to that of the reference feature vector, which is an element of the reference feature space. For example, a partial feature vector comprised of part of the elements of a feature vector is used as the reference feature vector.

The candidate table 13 stores mapping information indicating a correspondence between each value of the reference feature vector and a candidate category set. Accordingly, reference to the candidate table 13 allows a candidate category set corresponding to the value of a particular reference feature vector to be immediately obtained. When the value of the reference feature vector is given, the candidate category calculating unit 12 obtains the corresponding candidate category set by inputting that value to the mapping in the candidate table 13, and outputs the obtained set.

With such a pattern recognition device, a candidate category set can be output by simply referencing the candidate table without performing troublesome calculation of the distance between feature vectors, thereby significantly improving the speed of a pattern recognition process. Furthermore, a recognition accuracy can be realized whose degree is almost the same as that in the case in which the present invention is not applied, by properly setting the mapping in the candidate table 13.

By way of example, the table storing unit 11 shown in FIG. 2 corresponds to a memory 32 of FIG. 4, to be described later, and the candidate category calculating unit 12 corresponds to a CPU (Central Processing Unit) 31 and a memory 32.

According to the present invention, a candidate category calculating unit for outputting a candidate category set by referencing a candidate table which is prepared beforehand, without calculating the distance between feature vectors, is arranged. The candidate table includes a description of the information required for generating a mapping whose input is the value of a certain reference feature vector calculated from a feature vector, and whose output is a certain candidate category set.

The candidate category calculating unit obtains a candidate category set from the candidate table based on the value of an input reference feature vector, and outputs the obtained set. If the information suitable as the value of a reference feature vector and a mapping of a category set are stored in the candidate table, a classification whose speed is significantly improved can be implemented while maintaining an accuracy whose degree is almost the same as that in the case in which the high speed classification method according to the present invention is not applied.

Figure 3A:
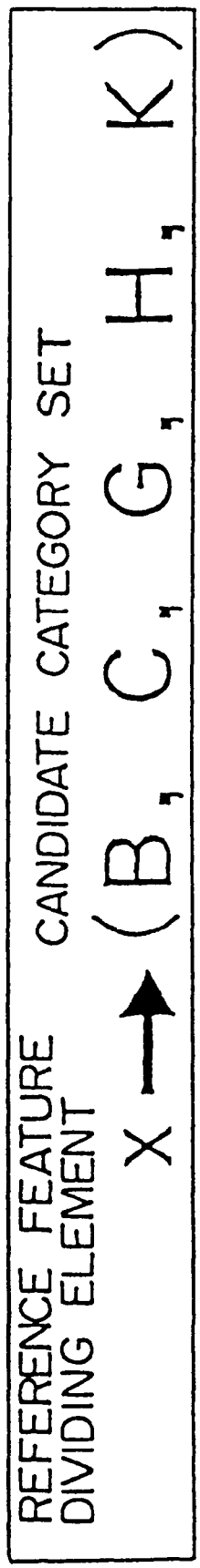
FIG. 3A is a schematic diagram showing a record of a candidate table.

FIG. 3A exemplifies a record in the candidate table. A reference feature dividing element "x" shown in FIG. 3A indicates a particular range of values or a particular value of the reference feature vector, and corresponds to a particular region or point in a reference feature space. If a value of the reference feature vector provided to the candidate category calculating unit is included in the reference feature dividing element "x", a corresponding candidate category set (B, C, G, H, K) is output as the result of the classification.

Figure 3B:
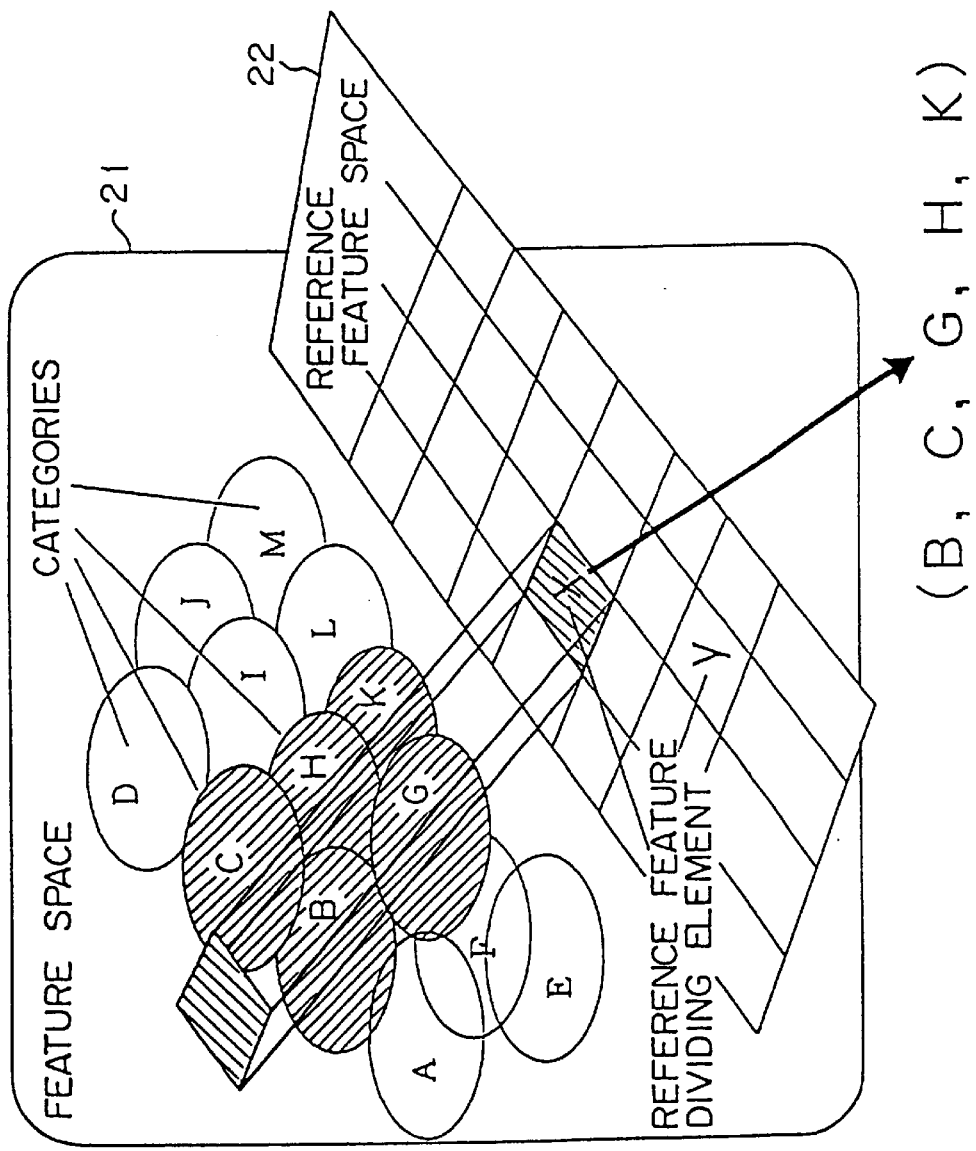
FIG. 3B is a schematic diagram showing categories and a reference feature space.

FIG. 3B shows the relationship between categories and a reference feature space. When a candidate table is generated, a reference feature space 22 is divided into a plurality of reference feature dividing elements according to a suitable standard, and the estimation of a projection (reference feature projection) of each of the categories A, B, C, D, E, F, G, H, I, J, K, L and M, which correspond to a feature space 21, into the reference feature space 22, is made. Then, for example, a portion common to the region of each of the reference feature dividing elements and reference feature projection of each category is obtained, and a set of categories in which the common portion exists is recognized as a corresponding candidate category set.

Since the projection of the categories B, C, G, H and K and the reference feature dividing element "x" share a portion in this case, the set (B, C, G, H, K) including the categories as its elements will become a candidate category set corresponding to the reference feature dividing element "x", as shown in FIG. 3A. The candidate category set corresponding to another reference feature dividing element "y" can be obtained in a similar manner.

As described above, a category including a portion shared by a reference feature projection and a reference feature dividing element is recognized as an element of a candidate category set, and a combination of the reference feature dividing element and the candidate category set is stored as a candidate table. The candidate category calculating unit then obtains the reference feature dividing element including a given value of the reference feature vector, and obtains a corresponding candidate category set using the candidate table. With this process, high-speed classification can be implemented without degrading its accuracy.

FIG. 4 is a block diagram showing the configuration of an information processing device for use in such a pattern recognition device. The information processing device shown in FIG. 4 comprises a CPU (Central Processing Unit) 31, memory 32, input device 33, output device 34, external storage device 35, medium driving device 36, network connection device 37, and a photoelectric converter 38. All of the components are interconnected via a bus 39.

The CPU 31 implements the process of the pattern recognition device using a program and a candidate table stored in the memory 32. As the memory 32, for example, a ROM (Read Only Memory), a RAM (Random Access Memory) etc., are used.

The input device 33 corresponds to, for example, a keyboard, pointing device, etc. It is used for inputting a request or an instruction from a user. The output device 34 corresponds to a display device, printer, etc. It is used for outputting an inquiry to a user, the result of a process, etc.

The external storage device 35 corresponds to, for example, a magnetic disk device, optical disk device, magneto-optical disk device, etc. It can store a program or data. Additionally, it is used as a database storing patterns, feature vectors, candidate tables, etc.

The medium driving device 36 drives a portable storage medium 40, and can access its stored contents. As the portable storage medium 40, an arbitrary computer-readable storage medium such as a memory card, floppy disk, CD-ROM (Compact Disc-Read Only Memory), optical disk, magneto-optical disk etc., can be used. The portable storage medium 40 stores a program for performing a pattern recognition process in addition to data.

The network connection device 37 is connected to an arbitrary communications network such as a LAN (Local Area Network), and performs data conversion, etc. accompanying with communications. The pattern recognition device can receive required data or programs from an external database etc., via the network connection device 37. The photoelectric converter 38 is, for example, an image scanner. It is used to input a pattern to be processed.

Figure 5:
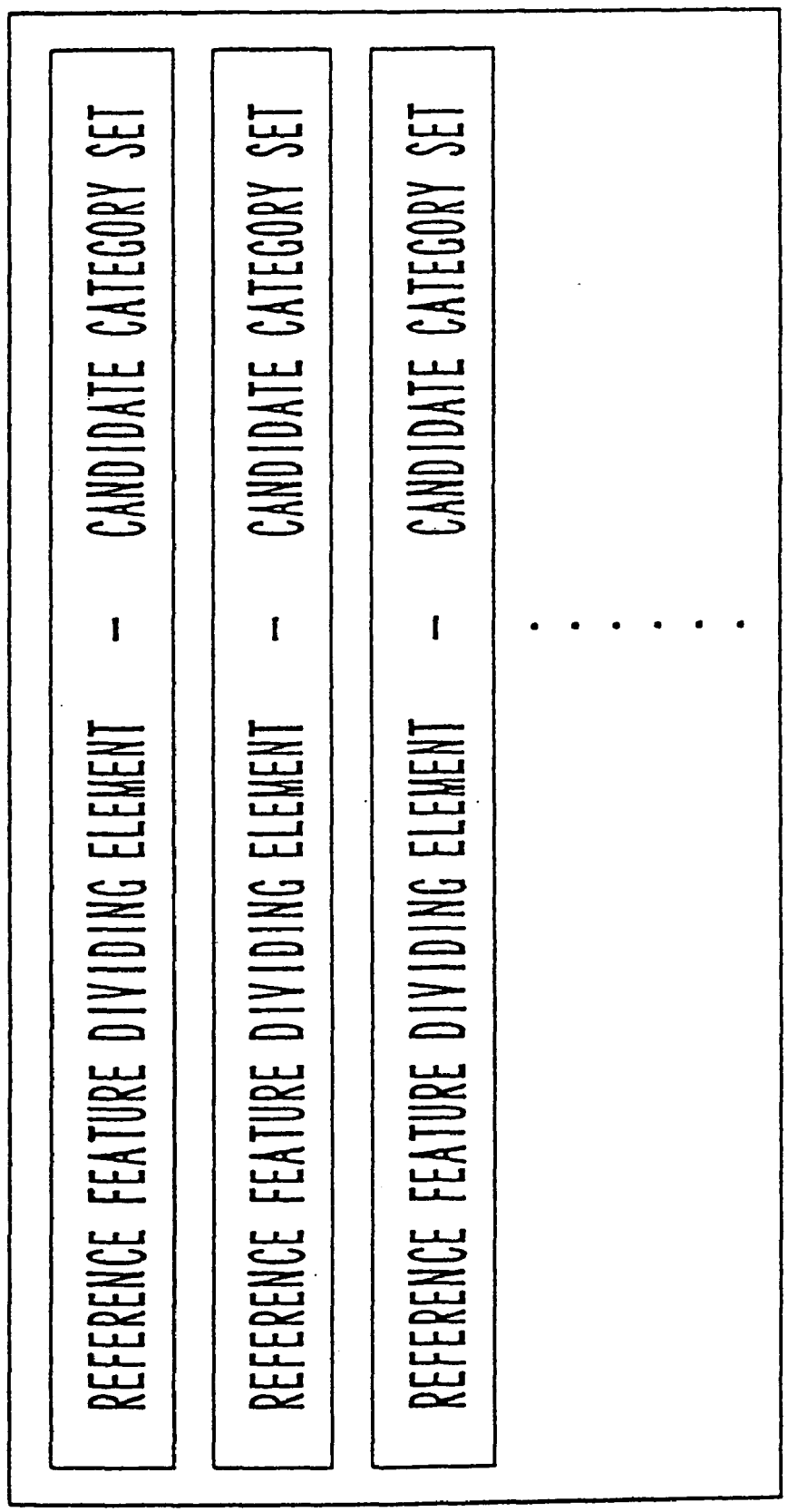
FIG. 5 shows the structure of a candidate table.

Provided next are the explanations about the specific examples of the reference feature vector and the candidate table, and the configuration of the pattern recognition device, by referring to FIGS. 5 through 14. FIG. 5 shows the structure of a candidate table used in this embodiment. The candidate table shown in FIG. 5 stores a plurality of combinations of a reference feature dividing element and a candidate category set, and is used to classify reference feature vectors.

Figure 6:
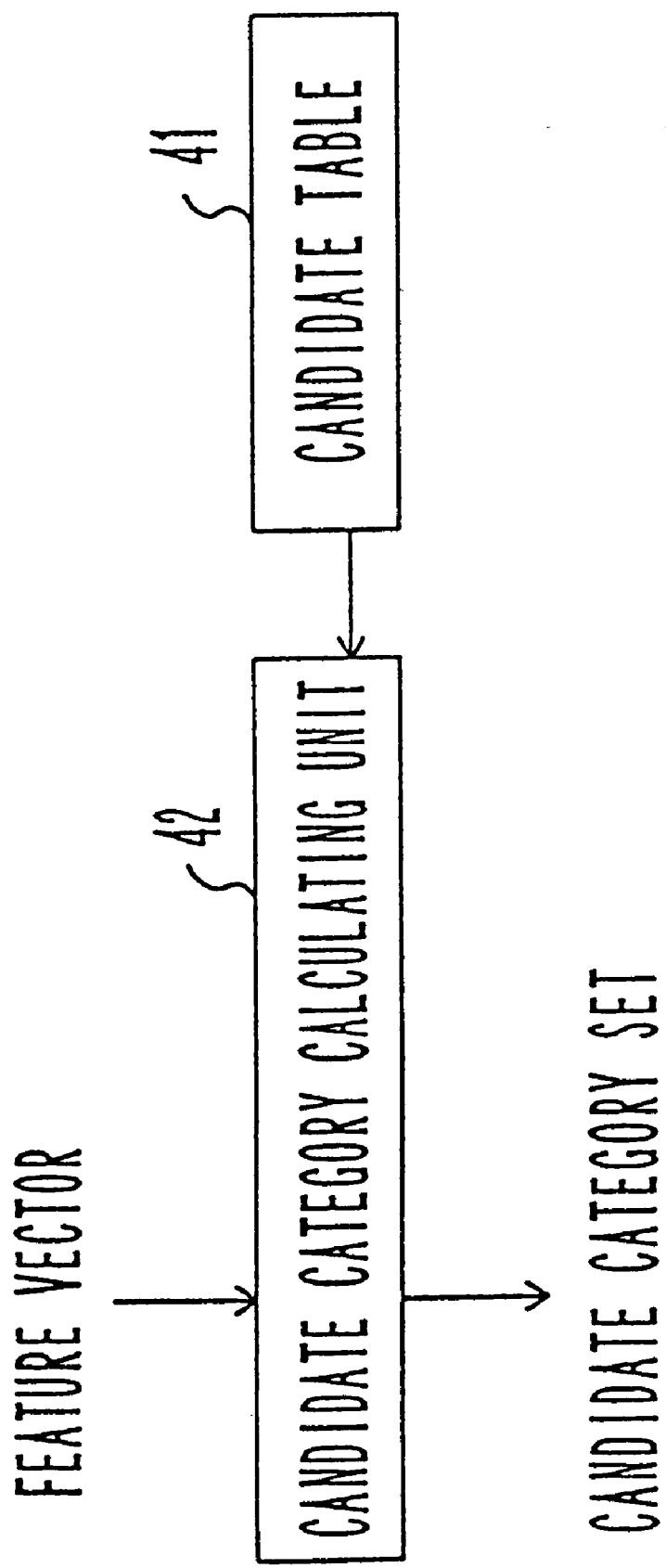
FIG. 6 is a schematic diagram showing the configuration of a first pattern recognition device.

FIG. 6 is a schematic diagram showing the configuration of a first pattern recognition device comprising a candidate table, which performs high-speed classification using a partial feature vector of an input feature vector. The pattern recognition device shown in FIG. 6 comprises a candidate table 41 storing combinations of the values of a reference feature vector calculated from a feature vector and category sets, and a candidate category calculating unit 42.

The candidate category calculating unit 42 recognizes a certain part of an input feature vector as a reference feature vector, obtains a candidate category set using the value of the reference feature vector and the candidate table 41, and outputs the obtained set.

Assume that the feature space formed by the feature vector is covered with "K" category feature sets $C_1, C_2, \ldots, C_K$, which do not overlap. At this time, assuming that the set of all the category feature sets is $C_{SET}$, it can be represented as follows:

$$C_{SET} = \{C_1, C_2, \ldots, C_K\}$$

Also assuming that the number of dimensions of the feature space is "N", a feature vector "f" can be represented using its elements as:

$$f = (f_1, f_2, \ldots, f_N)$$

At this time, the candidate category calculating unit 42 estimates a candidate category set $C_{CAND}$ including a category $C_{IN} \in C_{SET}$ to which an input feature vector $f_{IN}$ belongs, and outputs the estimated category set. As the reference feature vector, an arbitrary partial feature vector of the feature vector can be used.

Assuming that a two-dimensional partial feature vector $g=(f_1, f_2)$ is the reference feature vector, the candidate table 41 is structured by the combinations of the values of the two-dimensional partial feature vector and candidate category sets. All of the values that the two-dimensional partial feature vector can possibly adopt are registered in the candidate table 41. Assuming that each of the elements of the feature vector "f" can adopt any of three values "0", "1", and "2", the candidate table 41 will include the following combinations:

((0,0), $C_{(0,0)}$)
((0,1), $C_{(0,1)}$)
((0,2), $C_{(0,2)}$)
((1,0), $C_{(1,0)}$)
((1,1), $C_{(1,1)}$)
((1,2), $C_{(1,2)}$)
((2,0), $C_{(2,0)}$)
((2,1), $C_{(2,1)}$)
((2,2), $C_{(2,2)}$)

Here, $C_{(p,q)} \subset C_{SET}$ is a candidate category set corresponding to the value (p, q) (p=0, 1, 2; q=0, 1, 2) of the reference feature vector In this case, the point (p, q) in the reference feature space will become a reference feature dividing element.

The candidate category calculating unit 42 obtains the values (p,q) of the two-dimensional feature vector from the input feature vector, obtains combinations having (p, q) as the left element from the candidate table 41, and outputs a candidate category set $C_{(p,q)}$ as the right element.

With such a pattern recognition device, a candidate category set can be quickly obtained by referencing a candidate table without calculating a distance. If respective candidate category sets stored in the candidate table 41 are suitable, a pattern recognition device which performs pattern recognition at high speed and with high accuracy, can be implemented.

FIG. 7 is a schematic diagram showing the configuration of the second pattern recognition device which obtains a feature vector from an input pattern, recognizes part of the feature vector as a reference feature vector, and performs high-speed classification using a candidate table.

The pattern recognition device shown in FIG. 7 comprises a feature extracting unit 51 for extracting a feature vector from an input character pattern, a candidate category calculating unit 52, and a candidate table 53. The candidate table 53 is generated, for example, by using a character pattern set for a learning process.

Assume that the number of categories of character patterns is "K", and a feature space formed by the corresponding feature vectors is covered with "K" category feature sets $C_1, C_2, \ldots, C_K$, which do not overlap. At this time, the set $C_{SET}$ of all the category feature sets can be represented as follows:

$$C_{SET}=\{C_1, C_2, \ldots, C_K\}$$

The candidate category calculating unit 52 estimates the candidate category set $C_{CAND}$ including the category $C_{IN} \in C_{SET}$ to which the input character pattern $P_{IN}$ belongs, and outputs the estimated set.

Provided first is the explanation about a feature extracting process performed by the feature extracting unit 51. As a feature amount, which is frequently used for extracting a feature from a character pattern, a directional line element feature amount can be cited. This is a feature amount obtained by dividing a character pattern into two-dimensional grids, and counting the number of outline direction components within each of the grids.

Assuming that seven by seven grids are used, the number of girds will be 49 in total. Also assuming that the outline direction components are classified into four major directions such as horizontal, vertical, right-oblique, and left-oblique directions, the 196 feature amounts resultant from multiplying 49 by 4 can be obtained. With this process, a 196-dimensional feature vector is extracted from the input character pattern.

Assuming that the number of dimensions of a feature space is "N", the feature vector "f" can be generally represented using its elements as follows:

$$f=(f_1, f_2, \ldots, f_N)$$

The value of each of the elements of the feature vector "f" corresponds to the number of pixels having a particular directional component among outline pixels included in a particular grid. It is represented by, for example, an integer value equal to or greater than "0".

Also assuming that one element "$f_1$" of the feature vector is a one-dimensional reference feature vector "r" and the range of the value that the reference feature vector can adopt is $A \leq r < B$, the section [A,B) will become a reference feature space.

Assume that the reference feature space [A,B) is divided into grids, and each division is used as the reference feature dividing element which become the element of the candidate table. Since the reference feature space is one-dimensional in this case, each section $R_i$ will become a reference feature dividing element if the section [A,B) is divided into "L+1" sections $R_i=[s_{i-1}, s_i)$ (i=0, 1, . . . , L) as follows:

$$A=s_{-1}<s_0<s_1<s_2< \ldots <s_L=B$$

If the reference feature space is defined as an infinite space, it is sufficient to set "A=$-\infty$" and "B=$+\infty$".

Figure 8:
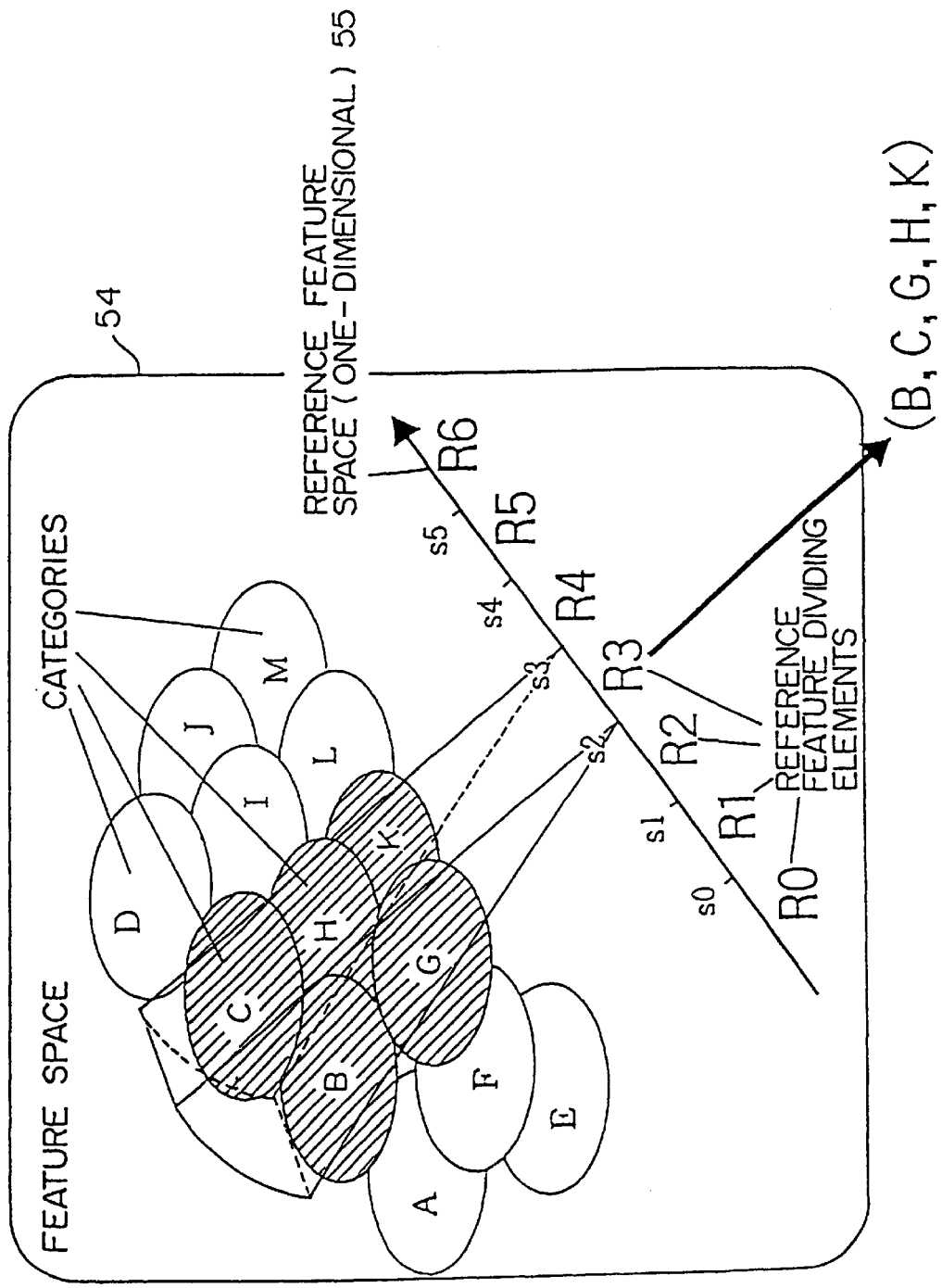
FIG. 8 is a schematic diagram showing a first reference feature space.

For example, the one-dimensional reference feature space 55 shown in FIG. 8 is divided into seven reference feature dividing elements $R_0=(-\infty, s_0)$, $R_1=[s_0, s_1)$, $R_2=[s_1, s_2)$, $R_3=[s_2, s_3)$, $R_4=[s_3, s_4)$, $R_5=[s_4, s_5)$, $R_6=[s_5, +\infty)$, based on the assumption that "L" is 6.

The candidate category set corresponding to each of the reference feature dividing elements "$R_i$"s is obtained by estimating a reference feature projection of each character category in a learning character pattern set. Then, the candidate table 53 is generated by using obtained candidate category sets.

Note that, however, the learning character pattern set includes character patterns belonging to respective character categories, the number of which is sufficient. The estimation of a reference feature projection of a particular character category "$C_k$" is made as follows:

First of all, character patterns belonging to the character category "$C_k$" are extracted from the learning character pattern set, and the features are extracted from the character patterns. Then, corresponding feature vectors are obtained. After a set $F_k$ of the first elements "$f_1$"s of the feature vectors is obtained from the set of the obtained feature vectors, the set $F_k$ forms the distribution which approximates the reference feature projection of the character category $C_k$. Then, the minimum value $MIN_k$ and the maximum value $MAX_k$ of the elements of the set $F_k$ are obtained. As a result, the estimated value $Q_k$ of the reference feature projection of the character category $C_k$ can be defined as the following closed section, in consideration of a particular margin M.

$$Q_k=[MIN_k-M, MAX_k+M]$$

The candidate category set "$D_i$" to be combined with each of the feature dividing elements "$R_i$"s, can be obtained from the above described reference feature dividing elements "$R_i$"s and the reference feature projection "$Q_k$" for each character category "$C_k$".

Here, a set of character categories "$C_k$"s in each of which a certain reference feature dividing element "$R_i$" and a reference feature projection "$Q_k$" shares a portion (a product set of "$R_i$" and "$Q_k$" is not an empty set) is defined to be the candidate category set "$D_i$" for the reference feature dividing element "$R_i$". By making such a definition, the candidate category set "$D_i$" will become a list of character categories to which character patterns respectively having the value of a reference feature vector belonging to a reference feature dividing element "$R_i$" can possibly belong.

Accordingly, the candidate category set "$D_i$" including character categories sufficient for maintaining a recognition accuracy can be obtained. The candidate table 53 will be structured by the combinations of the reference feature dividing element "$R_i$" and the candidate category set "$D_i$".

Since the projections of the categories B, C, G, H, and K and the reference feature dividing element $R_3$ share a portion in the feature space 54 shown in FIG. 8, the set (B, C, G, H, K) including the categories as its elements will become a candidate category set corresponding to the reference feature dividing element $R_3$. Also candidate category sets corresponding to the other reference feature dividing elements are obtained in a similar manner. Consequently, the candidate table 53 will become, for example, as that shown in FIG. 9.

If the value of the first element of an input feature vector is "r", the candidate category calculating unit 52 recognizes this value as the value of the reference feature vector, and obtains the reference feature dividing element "$R_i$" to which the value "r" belongs. Because the reference feature dividing element "$R_i$" is a one-dimensional section in this case, it is easy to determine which section the value "r" belongs to. Next, the candidate category calculating unit 52 obtains the candidate category "$D_i$" corresponding to the reference feature dividing element "$R_i$" by using the candidate table 53, and outputs the obtained category as a character recognition result. It is expected that the character category to which the input character pattern belongs is included in the output candidate category set.

With such a pattern recognition device, a candidate category to which an input character pattern is expected to belong can be quickly obtained without degrading its accuracy, not by calculating a distance, but by referencing a table.

Figure 10:
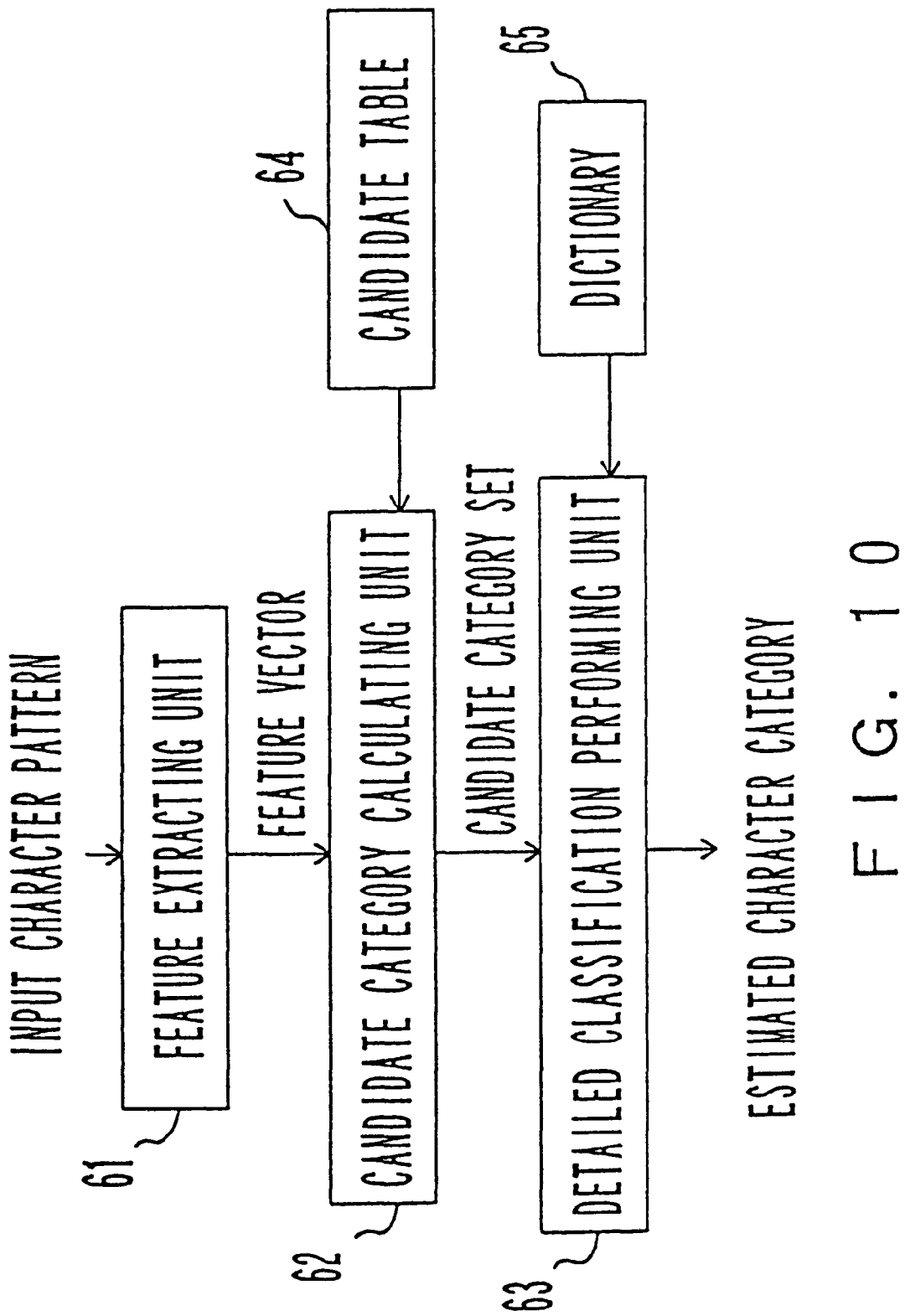
FIG. 10 is a schematic diagram showing the configuration of a third pattern recognition device.

FIG. 10 is a schematic diagram showing the configuration of the third pattern recognition device for obtaining a feature vector from an input character pattern, using a partial feature vector of the feature vector as a reference feature vector, and performing high-speed detailed classification using a candidate table.

The pattern recognition device shown in FIG. 10 comprises a feature extracting unit 61, candidate category calculating unit 62, detailed classification performing unit 63, candidate table 64, and a dictionary for performing detailed classification. The feature extracting unit 61 extracts a feature vector from an input character pattern.

Here, a Voronoï division formed by a representative feature vector of each character category, which is registered in the dictionary 65, is used to generate the candidate table 64.

The Voronoï division is one type of a region defined based on the distance from a plurality of points when the plurality of points are given in an arbitrary space. It is also referred to as a Voronoï region.

The notations of the set of category feature sets $C_{SET}$, feature vector "f", reference feature space, reference feature dividing element "$R_i$" etc., and the contents of the process for extracting a feature, are similar to those of the second pattern recognition device. The candidate category calculating unit 62 estimates a candidate category set $C_{CAND}$ including a category $C_{IN} \in C_{SET}$ to which an input character pattern $P_{IN}$ belongs, and outputs the estimated set.

The detailed classification performing unit 63 uses a candidate category output from the candidate category calculating unit 62 as an input, and calculates the distance using the dictionary 65. The dictionary 65 stores representative feature vectors for respective character categories. The detailed classification performing unit 63 obtains a representative feature vector whose distance from a feature vector corresponding to an input character pattern is the shortest, and outputs the character category corresponding to the obtained vector as an estimated character category.

Here, the estimated value "$Q_k$" of a reference feature projection corresponding to each character category "$C_k$" is obtained by using not a learning character pattern set, but a Voronoï division "$V_k$" obtained from a set of representative feature vectors "$E_j$"s, each of which corresponds to each character category "$C_j$" registered in the dictionary 65 for detailed classification.

The Voronoï division "$V_k$" for the character category "$C_k$" is a set of feature vectors "f"s whose distance to a representative feature vector "$E_k$" for the character category "$C_k$" is the shortest in a feature space, when the distance between an arbitrary feature vector "f" and all representative feature vectors registered in the dictionary 65 is obtained. It is known that the Voronoï division can be obtained by dividing the feature space using detailed classification based on a distance calculation.

Figure 11:
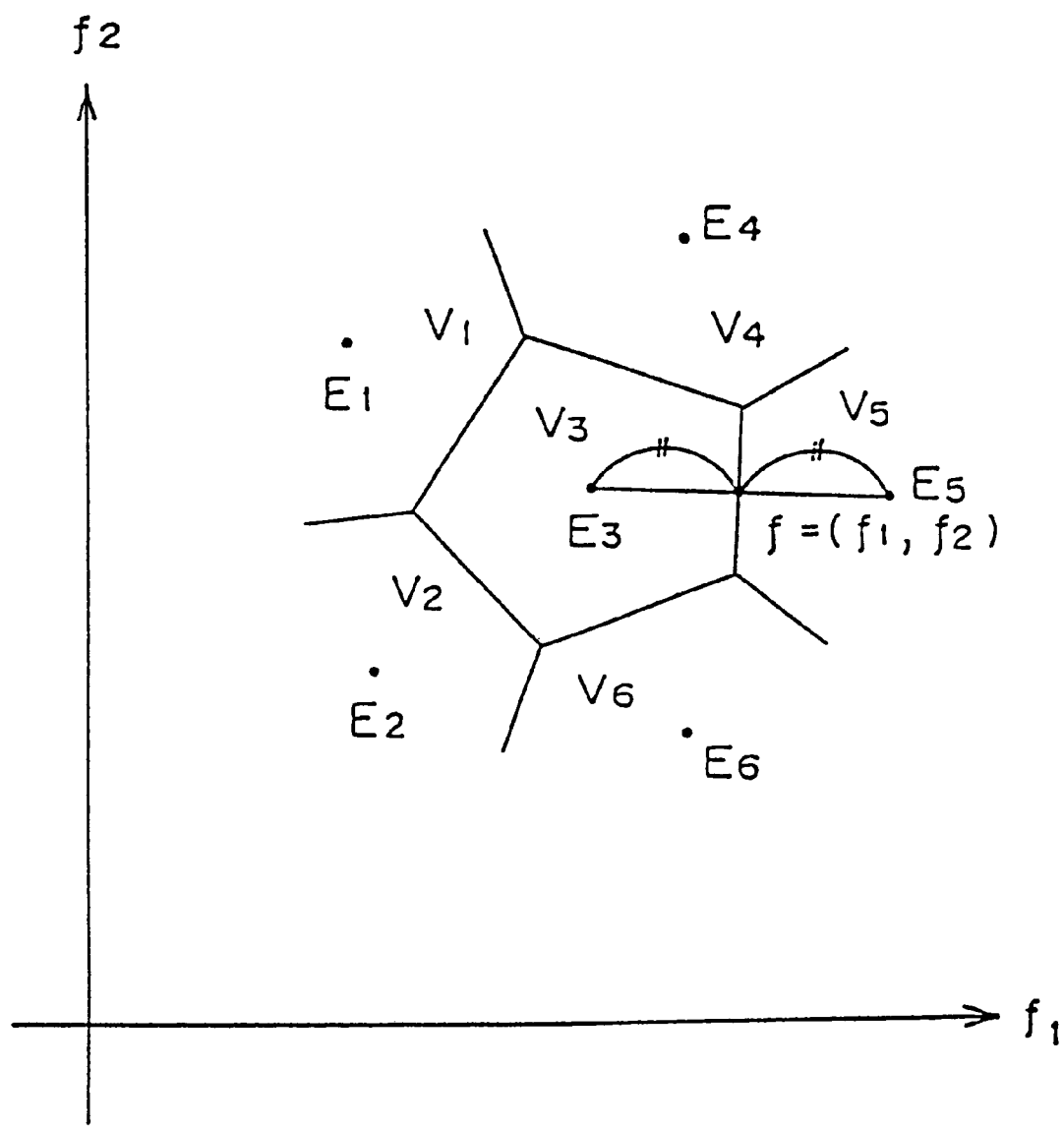
FIG. 11 is a schematic diagram showing a Voronoï division.

For example, if representative feature vectors $E_1$, $E_2$, $E_3$, $E_4$, $E_5$ and $E_6$ corresponding to categories $C_1$, $C_2$, $C_3$, $C_4$, $C_5$ and $C_6$ are given in a two-dimensional feature space, corresponding Voronoï divisions $V_1$, $V_2$, $V_3$, $V_4$, $V_5$ and $V_6$ will become as those shown in FIG. 11. In this figure, a feature vector $f=(f_1, f_2)$ on a boundary between the Voronoï divisions $V_3$ and $V_5$ is equidistant from the representative feature vectors $E_3$ and $E_5$. The same thing can be said about the other points on the other boundaries.

Normally, if a Euclidean distance is used in an N-dimensional feature space, the Voronoï division will become a hyper-convex-polyhedron formed by hyperplanes in the feature space. If a city block distance is used, the Voronoï division will become a hyperpolyhedron. Additionally, if a non-linear distance such as a Mahalanobis distance is used, the Voronoï division will become a bounded subset formed by hypersurfaces.

A hyper-surface in an N-dimensional space indicates an N-1 dimensional surface, and a hyperplane indicates its special form. The definitions and meanings of various distances such as a city block distance etc., will be described later.

Assuming that one element "$f_1$" of the feature vector "f" is a reference feature vector, the estimated value "$Q_k$" of the reference feature projection of the Voronoï division "$V_k$" into the reference feature space is provided as the range of the value of the feature vector "f" belonging to the Voronoï division "$V_k$". If the distance is a Euclidean distance, the minimum and maximum values of the reference feature vector of the Voronoï division "$V_k$" can be obtained with a linear programming method, and the estimated value "$Q_k$" of the reference feature projection can be obtained from these values.

For a more general distance, the estimated value "$Q_k$" of the reference feature projection can be obtained from the Voronoï division "$V_k$" with a nonlinear programming method if a one-dimensional reference feature vector is used. The method for estimating a reference feature projection with the linear and non-linear programming methods will be described later.

Then, a candidate category set "$D_i$" to be combined with each reference feature dividing element "$R_i$" is obtained by using the above described reference feature dividing element "$R_i$" and the reference feature projection "$Q_k$" for each character category "$C_k$".

For example, it is sufficient that a set of character categories "$C_k$"s, in each of which the reference feature dividing element "$R_i$" and the reference feature projection "$Q_k$" share a portion, is defined as a candidate category set "$D_i$" corresponding to the reference feature dividing element "$R_i$". With this process, the candidate category set "$D_i$" will become a list of character categories to which character patterns having the values of reference feature vectors belonging to the reference feature dividing element "$R_i$" can possibly belong.

Figure 12:
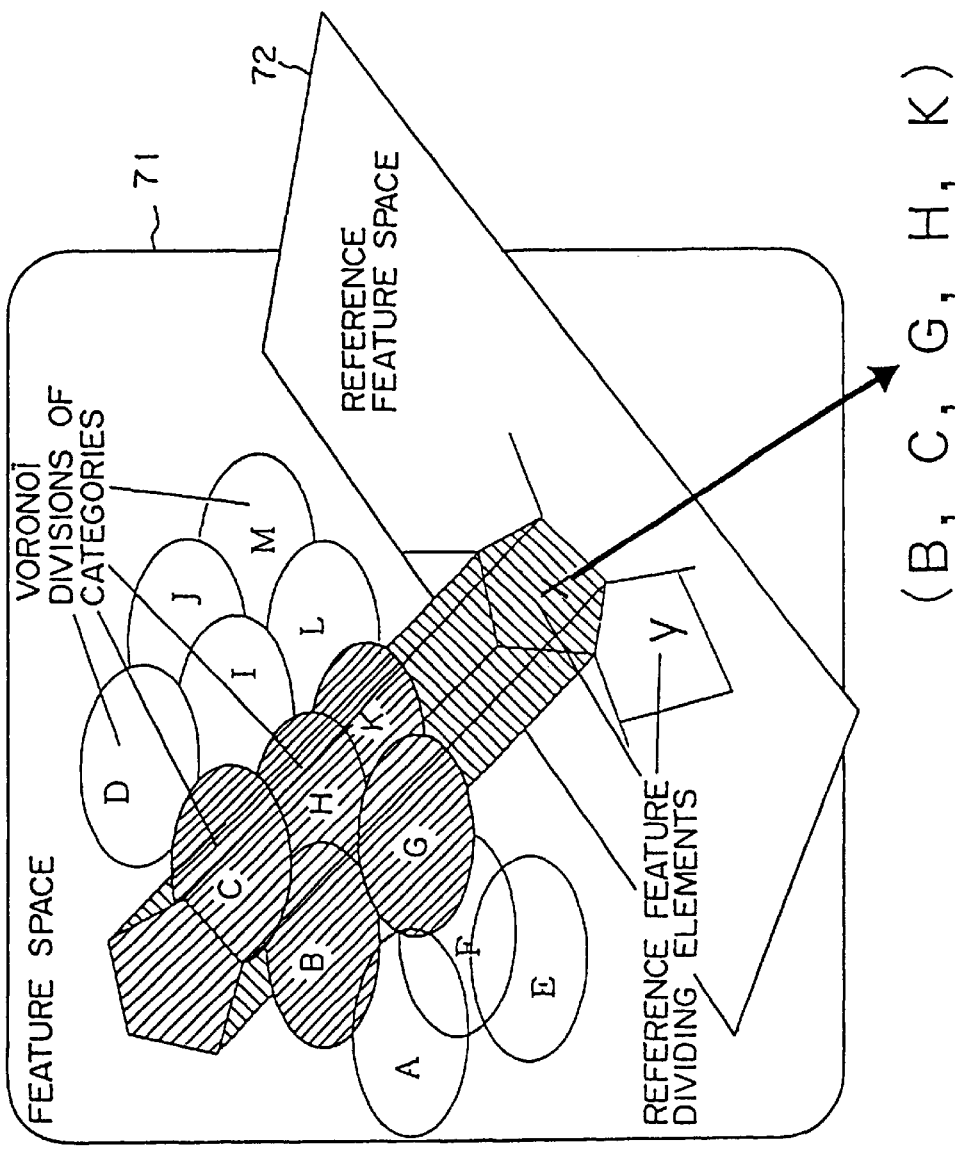
FIG. 12 is a schematic diagram showing a second reference feature space.

FIG. 12 is a schematic diagram showing the relationship between Voronoï divisions of categories and a two-dimensional reference feature space. In the feature space 71 of FIG. 12, the Voronoï divisions A, B, C, D, E, F, G, H, I, J, K, L and M, which correspond to respective categories, are projected into a reference feature space 72, so that the projection regions of the respective Voronoï divisions in the reference feature space 72 can be obtained. These regions will become the estimated values of the reference feature projections.

Then, the portion shared by the region of each reference feature dividing element and the reference feature projection of each category is obtained, and the set of categories including the shared portion is recognized as being the corresponding candidate category set.

Since the projections of the categories B, C, G, H and K and the reference feature dividing element "x" shares a portion in this case, the set (B, C, G, H, K) including these categories as its elements will become a candidate category set corresponding to the reference feature dividing element "x", in a similar manner as in the record shown in FIG. 3A. Also the candidate category set corresponding to another reference feature dividing element "y" is obtained in a similar manner.

The candidate table 64 is composed of combinations of the reference feature dividing element "$R_i$" and the candidate category set "$D_i$". The candidate category calculating unit 62 obtains a candidate category set from an input feature vector using the candidate table 64 in a similar manner as with the second pattern recognition device, and passes the obtained set to the detailed classification performing unit 63.

The detailed classification performing unit 63 extracts the representative feature vector of each character category belonging to the candidate category set screened by the candidate category calculating unit 62 by referencing the dictionary 65. Then, the detailed classification performing unit 63 calculates the distance between each representative feature vector and the feature vector corresponding to the input character pattern, and outputs a character category whose distance is the shortest as an estimated character category.

As described above, the reference feature projection of a Voronoï division corresponding to each character category used for detailed classification is obtained, and a character category corresponding to the reference feature projection having a portion common to a reference feature dividing element is recognized as a candidate category, so that a candidate category set including necessary and sufficient character categories can be obtained for detailed classification.

With this process, candidate categories expected to belong to an input character pattern can be quickly screened by referencing a table, while guaranteeing accuracy of detailed classification. As a result, the number of target character categories of the detailed classification can be significantly reduced, and a pattern recognition device which quickly performs recognition with high accuracy can be implemented.

Next, consider the case in which two elements ($f_1$, $f_2$) of the feature vector "f" is recognized as a two-dimensional reference feature vector "r" in the pattern recognition device shown in FIG. 10. Assuming that the ranges of the values that the respective elements of the reference feature vector "r" can adopt are $f_1 \in [A_1, B_1)$ and $f_2 \in [A_2, B_2)$, rectangular regions $[A_1, B_1) \times [A_2, B_2)$ will become a reference feature space.

The reference feature space $[A_1, B_1) \times [A_2, B_2)$ is divided into grids and they are used as the reference feature dividing elements which will become the elements of the candidate table 64. Therefore, the section $[A_1, B_1)$ is divided into "$L_1+1$" sections, and the section $[A_2, B_2)$ is divided into "$L_2+1$" sections.

$$A_1 = s_{-1} < s_0 < s_1 < s_2 < \ldots < s_{L1} = B_1$$

$$A_2 = t_{-1} < t_0 < t_1 < t_2 < \ldots < t_{L2} = B_2$$

If indices "i" and "j" are used, the reference feature dividing element $R_{(i,j)}$ is defined as follows.

$$R_{(i,j)} = \text{rectangle } [s_{i-1}, s_i) \times [t_{j-1}, t_j)$$

where $i = 0, 1, \ldots, L_1$, and $j = 0, 1, \ldots, L_2$. As a result, the reference feature dividing element $R_{(i,j)}$ will become a two-dimensional rectangular region. For example, the two-dimensional reference feature space 74 shown in FIG. 13 is divided into 24 (obtained by respectively setting $L_1$ and $L_2$ to 5 and 3, and multiplying (5+1) by (3+1)) reference feature dividing elements.

Next, all feature vectors belonging to the Voronoï division "$V_k$" corresponding to each character category "$C_k$" are extracted, and the range of the values of the reference feature vector ($f_1, f_2$) are recognized as the estimated value "$Q_k$" of the reference feature projection. Additionally, a set of character categories "$C_k$"S in each of which the reference feature dividing element $R_{(i,j)}$ and the reference feature projection "$Q_k$" share a portion, is recognized as a candidate category set $D_{(i,j)}$ corresponding to the reference feature dividing element $R_{(i,j)}$.

In this case, the candidate table 64 is composed of combinations of the reference feature dividing element $R_{(i,j)}$ and the candidate category set $D_{(i,j)}$. The processes of the feature extracting unit 61 and the detailed classification performing unit 63 are similar to those described above.

Figure 13:
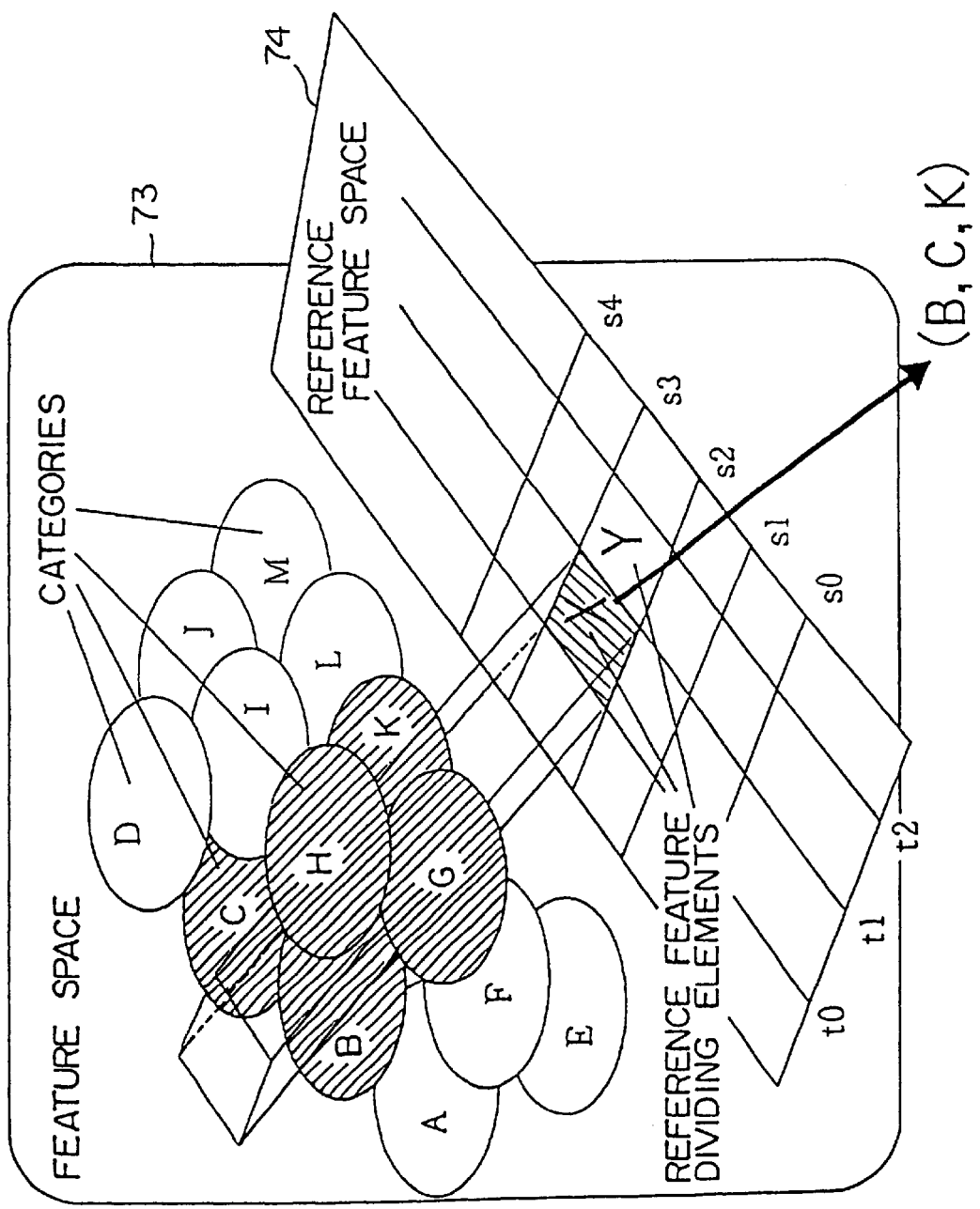
FIG. 13 is a schematic diagram showing a third reference feature space.

Since the projections of the categories B, C and K and a reference feature dividing element $X = [s_2, s_3) \times [t_0, t_1)$ share a portion in the feature space 73 of FIG. 13, the set (B, C, K) including these categories as its elements will become a candidate category set corresponding to the reference feature dividing element X. Furthermore, the projections of the categories G, H and K and a reference feature dividing element Y=[$s_2$, $s_3$]×[$t_1$, $t_2$) share a portion, the set (G, H, K) including these categories G, H and K as its elements will become a candidate category set corresponding to the reference feature dividing element Y. Accordingly, the candidate table 64 will become, for example, as shown in FIG. 14.

If the first and second elements of an input feature vector are respectively "$r_1$" and "$r_2$", the candidate category calculating unit 62 recognizes r=($r_1$,$r_2$) as the value of the reference feature vector, and first obtains the reference feature dividing element $R_{(i,j)}$ to which this value belongs. Because the reference feature dividing element $R_{(i,j)}$ is a two-dimensional rectangular region, it is easy to determine which region the value "r" belongs to. Next, the candidate category calculating unit 62 obtains the candidate category set $D_{(i,j)}$ corresponding to the reference feature dividing element $R_{(i,j)}$, and passes the obtained set to the detailed classification performing unit 63.

As described above, the reference feature space is not limited to a one-dimensional space. Generally, it may be set as an arbitrarily dimensional space. Summarized below is the method for generating a candidate table when the reference feature space is two-dimensional or more. The following example refers to the case in which the reference feature space is two-dimensional. However, the candidate table can be generated in a similar manner also when the reference feature space is three-dimensional or more.

First, consider the case in which the reference feature space is delimited by lines that are straight and perpendicular to the coordinate axes, and divided into grids, each of which is recognized as a reference feature dividing element. Assume that the two-dimensional index of each of the grids is (i,j), and the corresponding grid is represented as K(i,j). If the projection of the category "C" into the reference feature space and the grid K(i,j) share a portion, the category "C" is recognized as an element of the candidate category set S(i,j) for the grid K(i,j).

The obtained combination of each grid K(i,j) and the candidate category set S(i,j) in the reference feature space is thus represented by using the index (i,j) of the grid and the index of each category belonging to the candidate category set, and stored as a candidate table.

Next, consider the case in which Voronoï division of the reference feature space is performed by using a quantized point, and each Voronoï region is recognized as a reference feature dividing element. In this case, assume that the index of the quantized point representing each Voronoï region in the reference feature space is "i", and each quantized point is represented as ($x_i$,$y_i$). If the projection of the category "C" into the reference feature space and the Voronoï region "Vi" including the quantized point ($x_i$,$y_i$) share a portion, the category "C" is recognized to be an element of the candidate category set S(i) for the Voronoï region "Vi".

The obtained combination of each-Voronoï region "Vi" and the candidate category set S(i) in the reference feature space, is thus represented by using the index of the quantized point representing the Voronoï region "Vi" in the reference feature space and the index of each category belonging to the candidate category set, and stored as a candidate table.

For example, there are the above described two methods as the basis for obtaining a projection of a certain category into a reference feature space in these examples. One is the method for estimating a reference feature projection by projecting a feature vector corresponding to a pattern set for learning (learning pattern) into a reference feature space, while the other is the method for estimating a reference feature projection based on a Voronoï division using a representative feature vector registered to a dictionary for detailed classification.

Provided below is the explanation about the flows of a process for generating a candidate table using each of the estimation methods, by referring to FIGS. 15 through 19.

Figure 15:
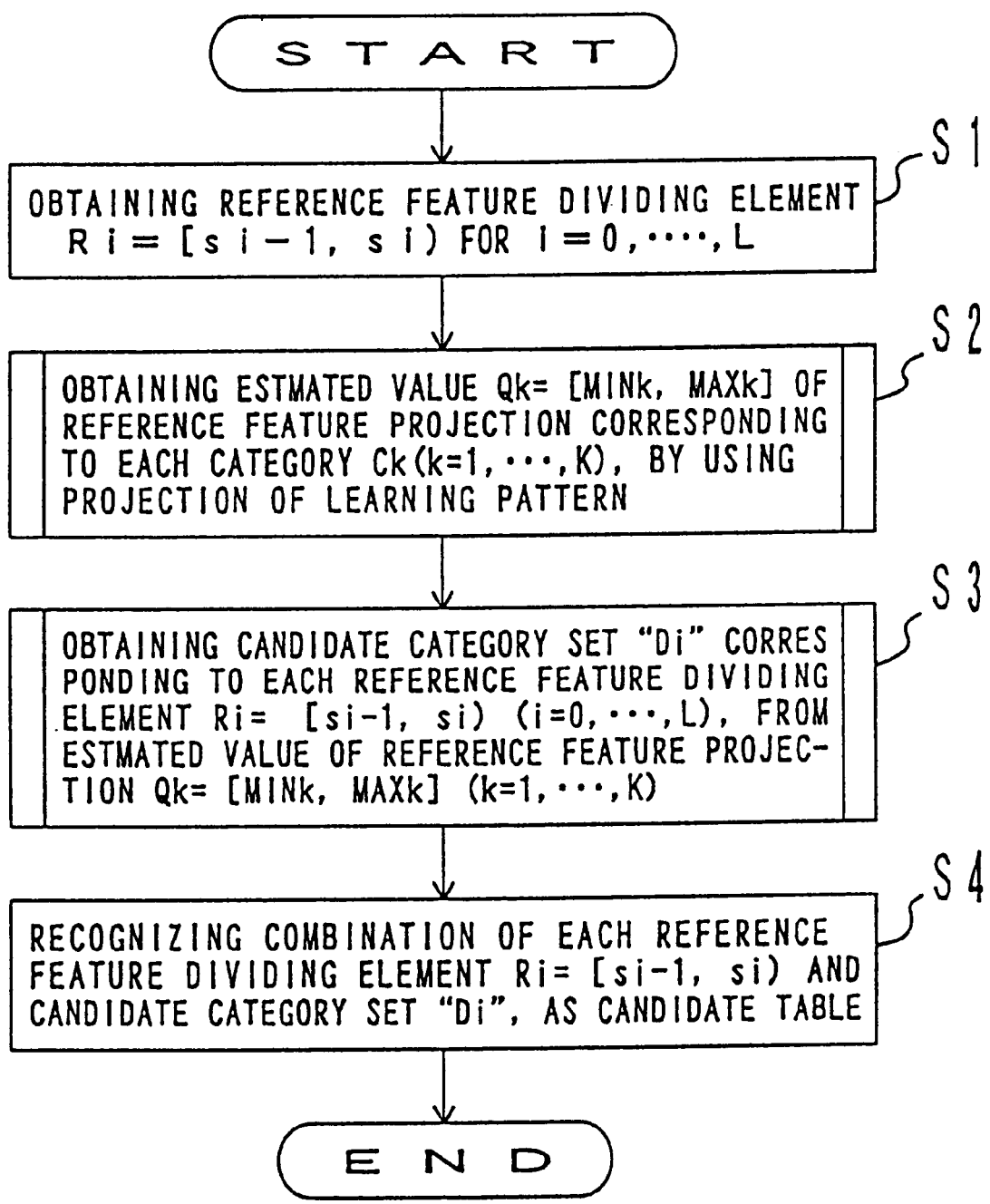
FIG. 15 is a flowchart showing a process for generating a candidate table using a learning pattern.

FIG. 15 is a flowchart showing the process for generating a candidate table using a learning pattern. The flowchart shown in FIG. 15 refers to the case of a one-dimensional reference feature space. However, this flow can be applied also to the case of a higher dimensional reference feature space.

Once the process is started, a pattern recognition device first obtains a reference feature dividing element $R_i$=[$s_{i-1}$, $s_i$) in a reference feature space for i=0, 1, . . . , L (step S1). Next, the pattern recognition device obtains an estimated value $Q_k$=[$MIN_k$,$MAX_k$] of a reference feature projection corresponding to each category $C_k$(k=1, . . . , K) using a projection of a learning pattern to the reference feature space (step S2).

The pattern recognition device then obtains a candidate category set "$D_i$" for each reference feature dividing element "$R_i$" from the estimated value $Q_k$ (k=1, . . . , K) (step S3). Then, the pattern recognition device stores the combination of each reference feature dividing element "$R_i$" and the candidate category set "$D_i$" in a candidate table (step S4), and terminates the process.

Figure 16:
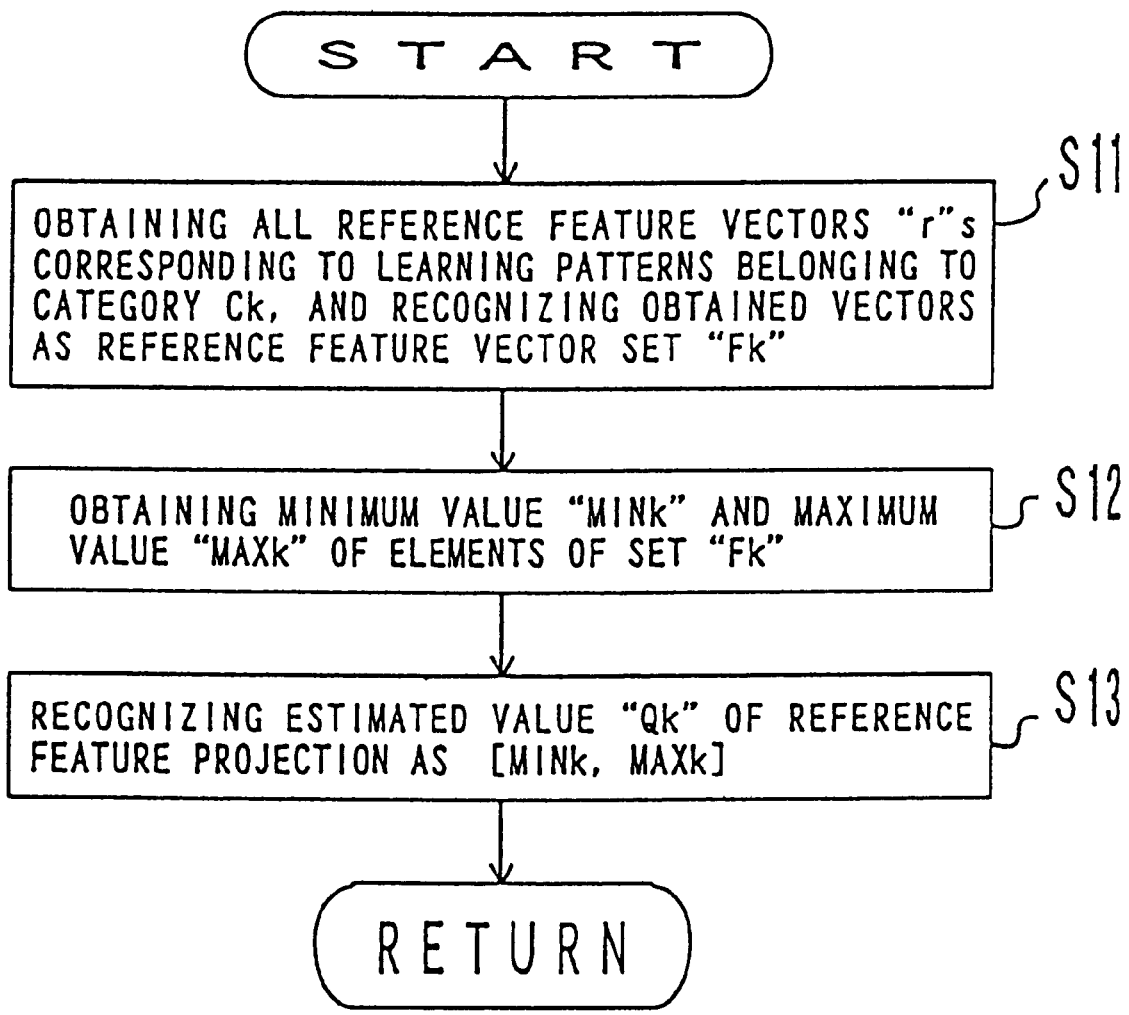
FIG. 16 is a flowchart showing a process for making an estimation using a learning pattern.

FIG. 16 is a flowchart showing the process for estimating a reference feature projection, which is performed in step S2 of FIG. 15. Once the process is started, the pattern recognition device first obtains the reference feature vector "r" for each learning pattern belonging to the category "$C_k$", and generates a set "$F_k$" of reference feature vectors "r"s (step S11).

Then, the pattern recognition device obtains the minimum and maximum values "$MIN_k$" and "$MAX_k$" of the elements of the set "$F_k$" (step S12), and sets the closed section [$MIN_k$, $MAX_k$] to the estimated value "$Q_k$" (step S13), and returns control to the process of FIG. 15. If a margin "M" is considered, the closed section [$MIN_k$–M, $MAX_k$+M] may be set to the estimated value "$Q_k$".

Figure 17:
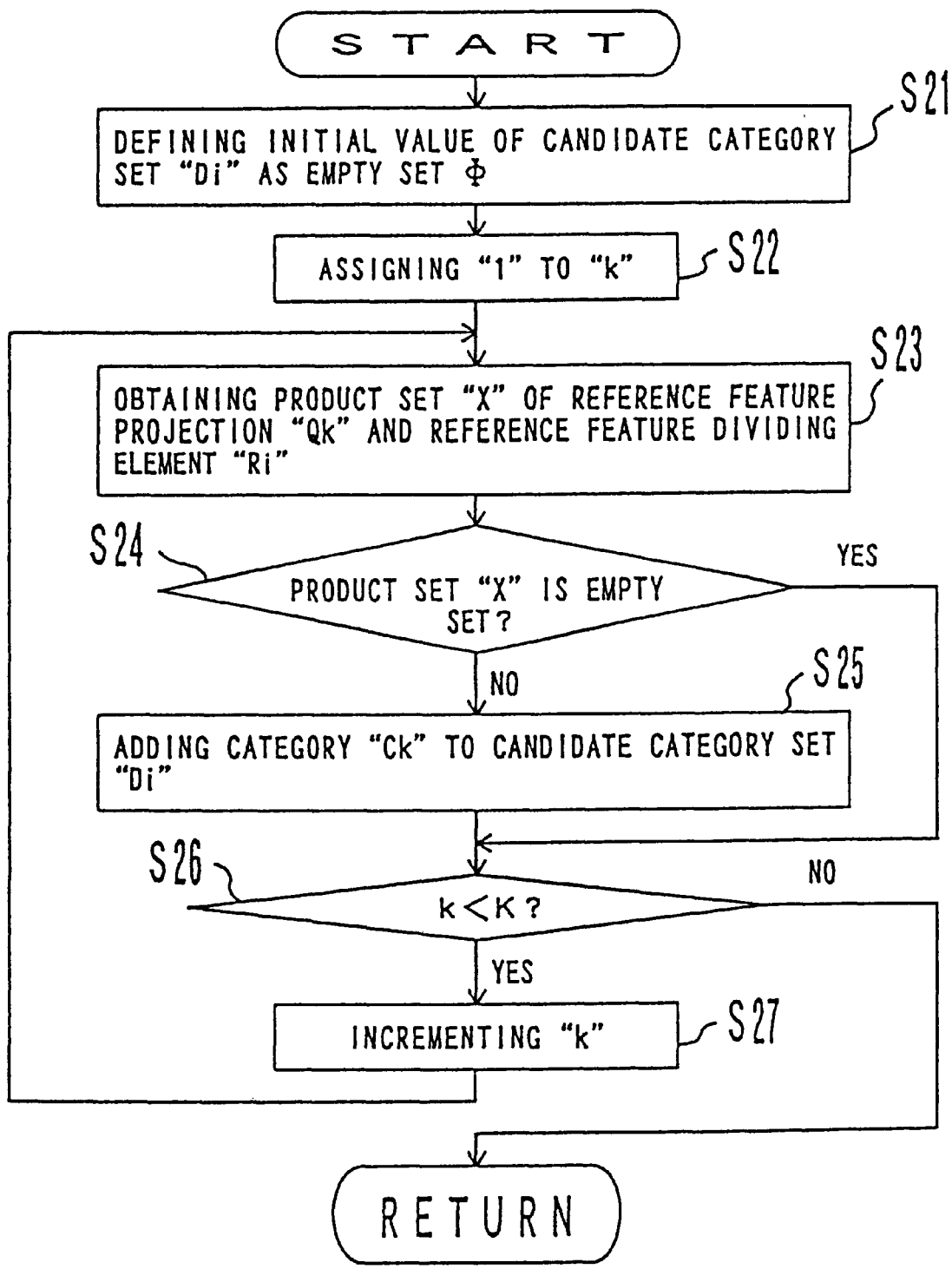
FIG. 17 is a flowchart showing a process for generating a candidate category set.

FIG. 17 is a flowchart showing the process for generating a candidate category set, which is performed in step S3 of FIG. 15. Once the process is started, the pattern recognition device recognizes the initial value of the candidate category set "$D_i$" as an empty set Φ (step S21), sets the control variable "k" to "1" (step S22), and obtains a product set "X" of the reference feature projection "$Q_k$" and the reference feature dividing element "$R_i$" (step S23).

The pattern recognition device then determines whether or not the product set "X" is an empty set (step S24). If it is not an empty set, the pattern recognition device adds the category "$C_k$" corresponding to the estimated value "$Q_k$" to the candidate category set "$D_i$" (step S25), and compares the value of "k" with "K" (step S26). If the value of "k" is smaller than "K", the pattern recognition device increments the value of "k" by 1 (step S27), and repeats the process in and after S23.

If the product set "X" is an empty set in step S24, the pattern recognition device immediately performs the process of step S26 without adding the category "$C_k$" to the candidate category set "$D_i$". When the value of "k" reaches "K" in step S26, the pattern recognition device returns control to the process of FIG. 15. In this way, the category "$C_k$" in which the reference feature dividing element "$R_i$" and the reference feature projection "$Q_k$" share a portion is added to the candidate category set "$D_i$" without exception. This process is performed for each reference feature dividing element "$R_i$".

FIG. 18 is a flowchart showing the process for generating a candidate table using Voronoï division. The flowchart shown in FIG. 18 refers to the case of a one-dimensional reference feature space. However, this flow can also be applied to the case of a higher-dimensional reference feature space.

Once the process is started, the pattern recognition device obtains a reference feature dividing element $R_i=[s_{i-1}, s_i)$ in a reference feature space for i=0, 1, . . . , L (step S31). Next, the pattern recognition device obtains the estimated value $Q_k=[MIN_k, MAX_k]$ of the reference feature projection for each category $C_k$(k=1, . . . , K) based on a Voronoï division in a feature space by using a linear programming method (step S32).

Then, the pattern recognition device obtains the candidate category set "$D_i$" corresponding to each reference feature dividing element "$R_i$," from the estimated value $Q_k$(k=1, . . . , K) in a similar manner to the process for generating a candidate category set, which is shown in FIG. 17 (step S33). The device stores the combination of each reference feature dividing element "$R_i$" and the candidate category set "$D_i$" in the candidate table (step S34), and terminates the process.

Figure 19:
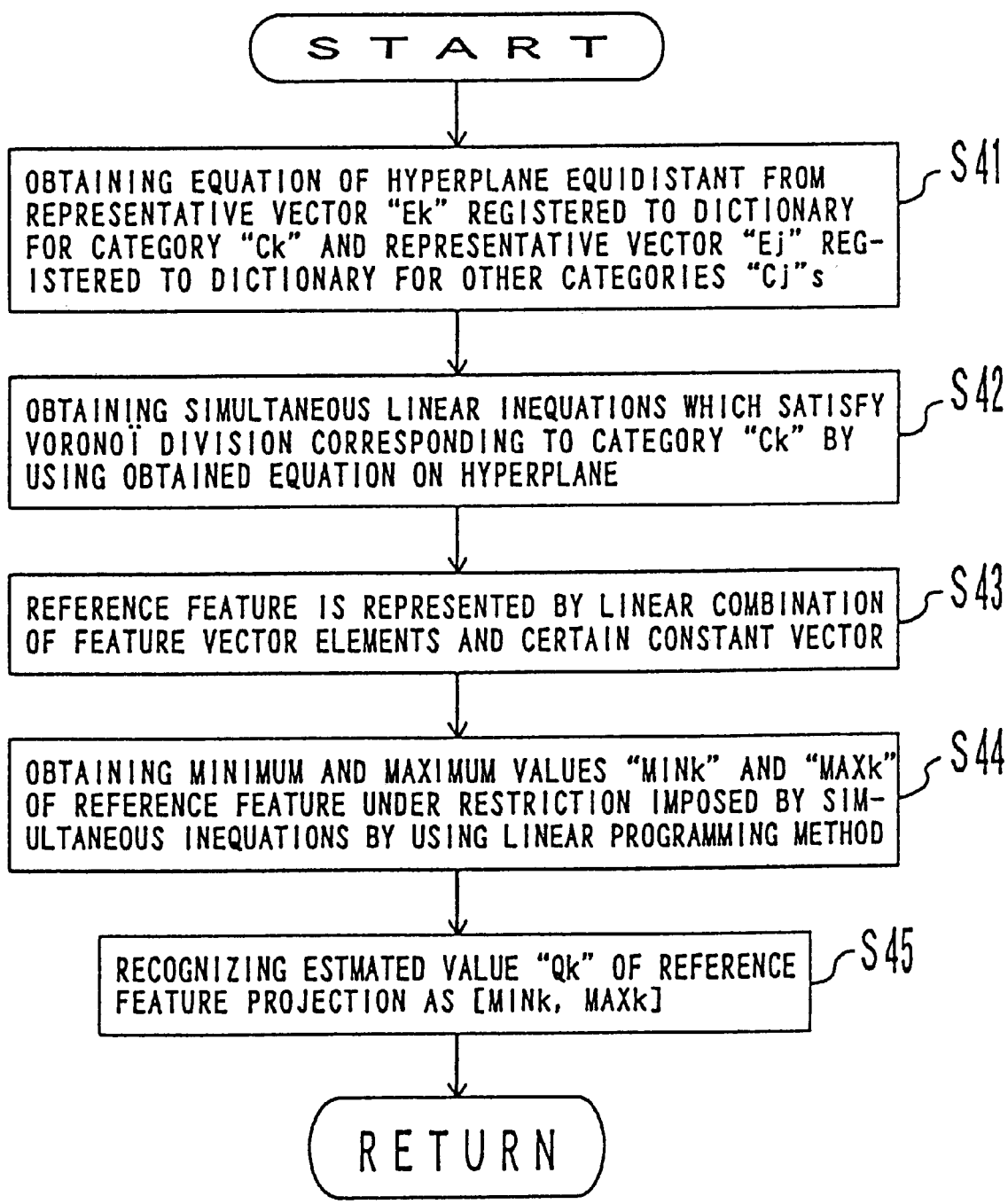
FIG. 19 is a flowchart showing a process for making an estimation using Voronoï divisions.

FIG. 19 is a flowchart showing the process for estimating a reference feature projection, which is performed in step S32 of FIG. 18. Once the process is started, the pattern recognition device obtains an equation of a plane (equidistant plane), which is equidistant from a representative feature vector "Ek" corresponding to the category "$C_k$" registered to the dictionary, and a representative feature vector "$E_j$" corresponding to another category $C_j$ (j=1, . . . , K; j≠k) (step S41). Note however that, the feature space is an N-dimensional space in this case.

When a Euclidean distance is used as a distance in the feature space, the Voronoï division "$V_k$" will become a hyper-convex-polyhedron in the feature space, which can be regarded as being a subset in the feature space formed by a plurality of hyperplanes. Accordingly, a hyperplane, which is a plane equidistant from two representative vectors, is represented by a linear equation in which a feature vector $f=(f_1, f_2, \ldots, f_N)$ is used as a variable.

Next, the pattern recognition device obtains simultaneous linear inequations satisfied by the Voronoï division "$V_k$" for the category "$C_k$" by using the obtained equations of hyperplanes (step S42). The simultaneous linear inequations are represented, for example, as follows:

$$\begin{cases} A_{11}f_1 + A_{12}f_2 + \ldots + A_{1N}f_N <= B_1 \\ A_{21}f_1 + A_{22}f_2 + \ldots + A_{2N}f_N <= B_2 \\ A_{31}f_1 + A_{32}f_2 + \ldots + A_{3N}f_N <= B_3 \\ \vdots \\ A_{K-1,1}f_1 + A_{K-1,2}f_2 + \ldots + A_{K-1,N}f_N \leq = B_{K-1} \end{cases}$$

Next, the device recognizes an inner product of the feature vector "f" and a directional vector $h=(h_1, h_2, h_N)$ as a one-dimensional reference feature vector (reference feature) "r" (step S43). At this time, the reference feature vector "r" will become as follows:

$r = h_1 f_1 + h_2 f_2 + \ldots + h_N f_N$

That is, the reference feature "r" is represented by the linear combination of the elements of the feature vector "f".

After all, the problem of obtaining the reference feature projection $Q_k$ is a linear programming problem which obtains the minimum and maximum values of the linear combination "r" satisfying the above described linear inequations. This problem can be solved with a well-known linear programming method.

Accordingly, the pattern recognition device obtains the minimum and maximum values "$MIN_k$" and "$MAX_k$" of the reference feature "r" with the linear programming method under the restriction imposed by the obtained simultaneous inequations (step S44), recognizes the closed section [$MIN_k$, $MAX_k$] as the estimated value "$Q_k$" of the reference feature projection (step S45), and returns control to the process in FIG. 18.

Here, the linear programming method is used for the estimation process. Generally, the minimum and maximum values in a one-dimensional section can be obtained with a non-linear programming method. In this case, the value, such as the following one obtained from the elements of the feature vector by using a certain non-linear function "R", is defined as a reference feature "r".

$r = R(f_1, f_2, \ldots, f_N)$

At this time, the Voronoï division becomes a subset in the feature space surrounded by hyper-convex surfaces in the feature space. Accordingly, the Voronoï division "$V_k$" for the character category "$C_k$" can be represented by the following simultaneous nonlinear inequations:

$$\begin{cases} S_1(f_1, f_2, \ldots, f_N) <= 0 \\ S_2(f_1, f_2, \ldots, f_N) <= 0 \\ S_3(f_1, f_2, \ldots, f_N) <= 0 \\ \vdots \\ S_{K-1}(f_1, f_2, \ldots, f_N) <= 0 \end{cases}$$

After all, the problem for obtaining the reference feature projection "$Q_k$" is concluded to be a non-linear programming problem of obtaining the maximum and minimum values of the reference feature "r", which satisfy the above described simultaneous inequations. A numerical calculation performed by a computer for the non-linear programming problem is well-known as a field of mathematical programming. This problem is solved by this calculation.

In the above described embodiment, one type of reference feature vector is used for obtaining a candidate category. However, a plurality of corresponding candidate category sets may be obtained by using a plurality of reference vectors calculated from one feature vector, and their logical product may be output.

In this case, a plurality of candidate tables corresponding to various reference feature vectors are provided, and a candidate category calculating unit is arranged for each of the plurality of candidate tables. Each candidate category calculating unit uses the value of a reference feature vector of a particular type as an input, references a corresponding candidate table, and outputs a corresponding candidate category set. Furthermore, a candidate category screening unit for calculating a logical product of candidate category sets is arranged in order to screen the candidate categories at the final stage, and output the screened categories.

Figure 20:
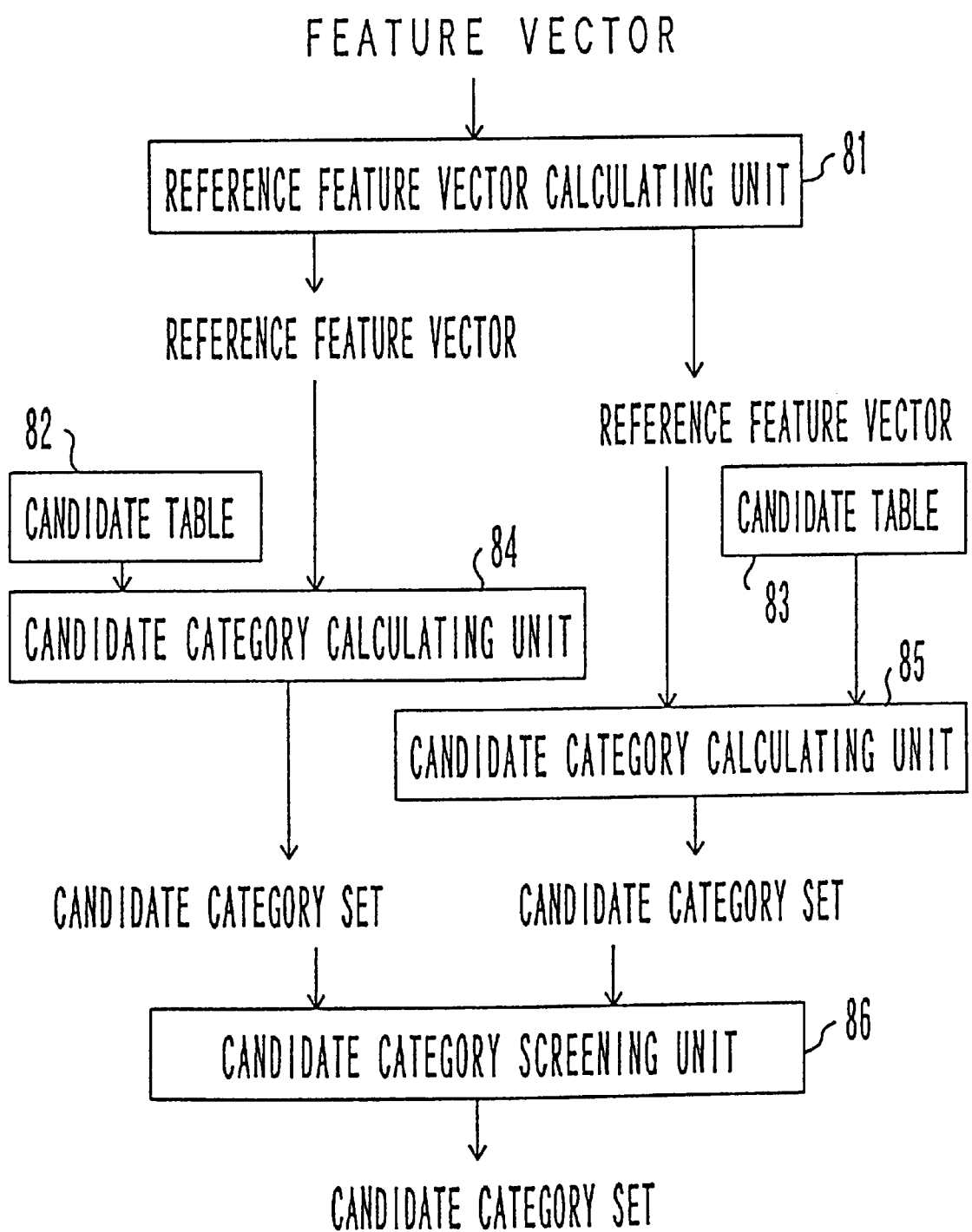
FIG. 20 is a schematic diagram showing the configuration of a fourth pattern recognition device.

FIG. 20 is a schematic diagram showing the configuration of a fourth pattern recognition device for calculating a candidate category, using two types of reference feature vectors at two stages. The pattern recognition device shown in FIG. 20 comprises a reference feature vector calculating unit 81, candidate tables 82 and 83, candidate category calculating units 84 and 85, and a candidate category screening unit 86.

The reference feature vector calculating unit 81 calculates two reference feature vectors $r_1$ and $r_2$ from an input N-dimensional feature vector "f". The candidate category calculating unit 84 at the first stage uses the reference feature vector $r_1$ as an input, and outputs a candidate category set $D_1(r_1)$ using the candidate table 82 which is stored in advance. The candidate category calculating unit 85 at the second stage uses the reference feature vector $r_2$ as an input, and outputs a candidate category set $D_2(r_2)$ using the candidate table 83 which is stored in advance.

The candidate category screening unit 86 uses two candidate category sets $D_1(r_1)$ and $D_2(r_2)$, obtains their product $D_1(r_1) \cap D_2(r_2)$, and outputs the obtained product as a final candidate category set.

The reference feature vector calculating unit 81 respectively outputs, for example, a first element $f_1$ of the feature vector "f" as a one-dimensional reference feature vector $r_1$, and a second element $f_2$ of the feature vector "f" as a one-dimensional reference feature vector $r_2$. Assuming that the ranges of the values of the respective reference feature vectors are $A_1 \leq r_1 < B_1$ and $A_2 \leq r_2 < B_2$, the sections $[A_1, B_1)$ and $[A_2, B_2)$ will respectively become the first and second reference feature spaces.

Here, assume that each reference feature space is divided into grids and they are used as reference feature dividing elements which will become the elements of a candidate table. Since both of the reference feature spaces $[A_1, B_1)$ and $[A_2, B_2)$ are one-dimensional, they are respectively divided into $L_1$ and $L_2$ sections, and the respective sections are defined as the reference feature dividing elements:

$$A_1 = s_0 < s_1 < s_2 < \ldots < s_{L1} = B_1$$

$$A_2 = t_0 < t_1 < t_2 < \ldots < t_{L2} = B_2$$

As a result, each section $[s_{i-1}, s_i)$ in the reference feature space $[A_1, B_1)$ will become a reference feature dividing element $R_{1i}$ for the reference feature vector $r_1$. Here, $i=1, \ldots, L_1$. In the meantime, each section $[t_{j-1}, t_j)$ in the reference feature space $[A_2, B_2)$ will become a reference feature dividing element $R_{2j}$ for the reference feature vector $r_2$. Here, $j=1, \ldots, L_2$.

Candidate category sets for the respective reference feature dividing elements $R_{1i}$ and $R_{2j}$ are obtained by estimating reference feature projections for respective categories using a learning feature vector set. Assume that the learning feature vector set includes a sufficient number of feature vectors belonging to respective categories. The method for estimating a reference feature projection for a particular category "$C_k$" is described below.

First of all, a set $F_{1k}$ of the first elements "$f_1$"s of the feature vector is obtained from a feature vector set for the category "$C_k$" belonging to the learning feature vector set. The set $F_{1k}$ forms a distribution approximating the first reference feature projection of the category "$C_k$". The minimum and maximum values $MIN(F_{1k})$ and $MAX(F_{1k})$ of the elements of the set "$F_{1k}$" are obtained, and the estimated value "$Q_{1k}$" of the first reference feature projection of the category "$C_k$" is defined in consideration of a particular margin "M" as follows:

$$Q_{1k} = [MIN(F_{1k}) - M, MAX(F_{1k}) + M]$$

Also the second reference feature projection is estimated in a similar manner. First, a set $F_{2k}$ of the second elements "$f_2$"s of the feature vectors is obtained from the feature vector set for the category "$C_k$" belonging to the learning feature vector set. The set "$F_{2k}$" forms a distribution approximating the second reference feature projection of the category "$C_k$". The minimum and maximum values $MIN(F_{2k})$ and $MAX(F_{2k})$ of the elements of the set "$F_{2k}$" are obtained, and the estimated value $Q_{2k}$ of the second reference feature projection of the category $C_k$ is defined in consideration of a particular margin "M" as follows:

$$Q_{2k} = [MIN(F_{2k}) - M, MAX(F_{2k}) + M]$$

Then, candidate category sets $D_1(r_1) = D_{1i}$ and $D_2(r_2) = D_{2j}$, to be combined with the respective reference feature dividing elements $R_{1i}$ and $R_{2j}$, are obtained using the reference feature projections $Q_{1k}$ and $Q_{2k}$ for the respective categories "$C_k$"s, according to the following procedure.

A set of categories "$C_k$"s in which the reference feature dividing element $R_{1i}$ and the corresponding reference feature projection $Q_{1k}$ share a portion, is assumed to be a candidate category set $D_{1i}$ for the reference feature dividing element $R_{1i}$. Based on this assumption, categories to which feature vectors, having the values of reference feature vectors belonging to the reference feature dividing element $R_{1i}$, may belong are listed and will become a candidate category set $D_{1i}$.

Similarly, a set of categories "$C_k$"s in which the reference feature dividing element "$R_{2j}$" and the corresponding reference feature projection "$Q_{2k}$", is assumed to be a candidate category set $D_{2j}$ for the reference feature dividing element $R_{2j}$. Based on this assumption, categories to which feature vectors, having the values of reference feature vectors belonging to the reference feature dividing element $R_{2j}$, may belong are listed and will become a candidate category set $D_{2j}$.

The candidate table 82 referenced by the candidate category calculating unit 84 is composed of combinations of the reference feature dividing element $R_{1i}$ and the candidate category set $D_{1i}$. Similarly, the candidate table 83 referenced by the candidate category calculating unit 85 is composed of combinations of the reference feature dividing element $R_{2j}$ and the candidate category set $D_{2j}$.

If a given value of the reference feature vector is "$r_1$", the candidate category calculating unit 84 first obtains the reference feature dividing element $R_{1i}$ to which the value $r_1$ belongs. Next, the unit obtains the candidate category set $D_{1i}$, corresponding to the reference feature dividing element $R_{1i}$, by using the candidate table 82, and outputs the obtained set. The output candidate category set $D_{1i}$ is expected to include a category to which the input feature vector belongs.

Similarly, if a given value of the reference feature vector is "$r_2$", the candidate category calculating unit 85 first obtains the reference feature dividing element $R_{2j}$ to which the value $r_2$ belongs. Next, the unit obtains the candidate category set $D_{2j}$, corresponding to the reference feature dividing element $R_{2j}$, by using the candidate table 83, and outputs the obtained set. The output candidate category set $D_{2j}$ is expected to include a category to which the input feature vector belongs.

Then, the candidate category screening unit 86 obtains the product $D_{1i} \cap D_{2j}$ of the two candidate category sets $D_{1i}$ and $D_{2j}$, and recognizes it as a final candidate category set. It can be estimated that the candidate category set output from the candidate category screening unit 86 still includes the category to which the input feature vector belongs. The number of the elements of that candidate category set becomes smaller than those of the original two candidate category sets $D_{1i}$ and $D_{2j}$. Accordingly, the candidate category screening unit 86 is proved to serve as screening candidate category sets at the final stage.

Because two one-dimensional reference feature vectors are used according to such a pattern recognition device, the number of candidate categories can be reduced in comparison with the case in which a single one-dimensional feature vector is used. Furthermore, compared with the case in which a single two-dimensional reference feature vector is used, the number of reference feature dividing elements is significantly reduced, thereby reducing storage capacity required for a candidate table.

By using a plurality of relatively low-dimensional reference feature vectors as described above, the pattern recognition device for quickly recognizing a pattern with high accuracy can be implemented with a storage capacity which is practical enough. Such a process for obtaining a plurality of candidate category sets may be sequentially performed. However, its process time can be further reduced if it is performed in parallel.

In the meantime, described below is the reason why the pattern recognition device according to the present invention hardly degrades recognition accuracy. After high-speed classification is performed according to the present invention, detailed classification using the distance calculation for the original feature vector is normally and additionally performed in order to identify the category of an input pattern.

The phenomenon that the degradation of the recognition accuracy is "0" means that an accumulated recognition accuracy of an output candidate category set guarantees (does not degrade) the accuracy of detailed classification to be performed at a later stage. The accumulated recognition accuracy indicates the probability that any of the candidate category sets includes a true category of an input pattern. Ideally speaking, it is desirable that the accumulated recognition accuracy is 100%.

Actually, it is not always necessary that the accumulated recognition accuracy of an output candidate category set be 100%. It is sufficient that the accumulated recognition accuracy is equal to or higher than the accuracy of detailed classification performed at a later stage. Therefore, a pattern recognition device whose accuracy degradation is practically "0" can be implemented by registering a candidate category set including a sufficient number of candidate categories to a candidate table.

If a true category is not included in a candidate category set, that is, if a classification error occurs, a similar classification error may possibly occur during detailed classification. Therefore, the final accumulation recognition accuracy is not expected to differ. In this meaning, the high-speed classification according to the present invention tactfully uses the restriction imposed by detailed classification, thereby implementing the high-speed classification without degrading the accuracy.

It is not always necessary that the reference feature vector according to the present invention be as the above described partial feature vector. An arbitrary vector which can be calculated from a feature vector can be used as the reference feature vector. For example, the compressed feature vector used by the pattern recognition device shown in FIG. 1 is one type.

FIG. 21 is a schematic diagram showing the configuration of the fifth pattern recognition device for obtaining a candidate category set by using a compressed feature vector as a reference feature vector, and performing detailed classification for the obtained candidate category set. The pattern recognition device shown in FIG. 21 comprises a feature extracting unit 91, feature compressing unit 92, candidate category calculating unit 93, detailed classification performing unit 94, candidate table 95, and a dictionary 96.

The feature extracting unit 91 extracts a feature vector from an input pattern. The feature compressing unit 92 performs suitable transformation for the feature vector, and generates a compressed feature vector whose number of dimension is smaller. The candidate category calculating unit 93 references the candidate table 95, and obtains the candidate category set corresponding to a given compressed feature vector.

The detailed classification performing unit 94 calculates the distance between a representative feature vector stored in the dictionary 96 and the feature vector of the input pattern, for each of the candidate categories in the candidate category set output from the candidate category calculating unit 93. Then, the detailed classification performing unit 94 sorts the candidate categories in the ascending order of the distances, and outputs a sequence of categories by a specified number from the category whose distance is the shortest.

With such a pattern recognition device, a desired reference feature vector can be generated by suitably selecting transformation used to compress a feature, and candidate category sets can be screened more effectively by using the corresponding candidate table. Additionally, a compressed feature vector resultant from the compression of a feature is not directly used to calculate the distance, but used as the value for referencing a candidate table. Accordingly, the processing accuracy is not degraded from a principle viewpoint.

Figure 22:
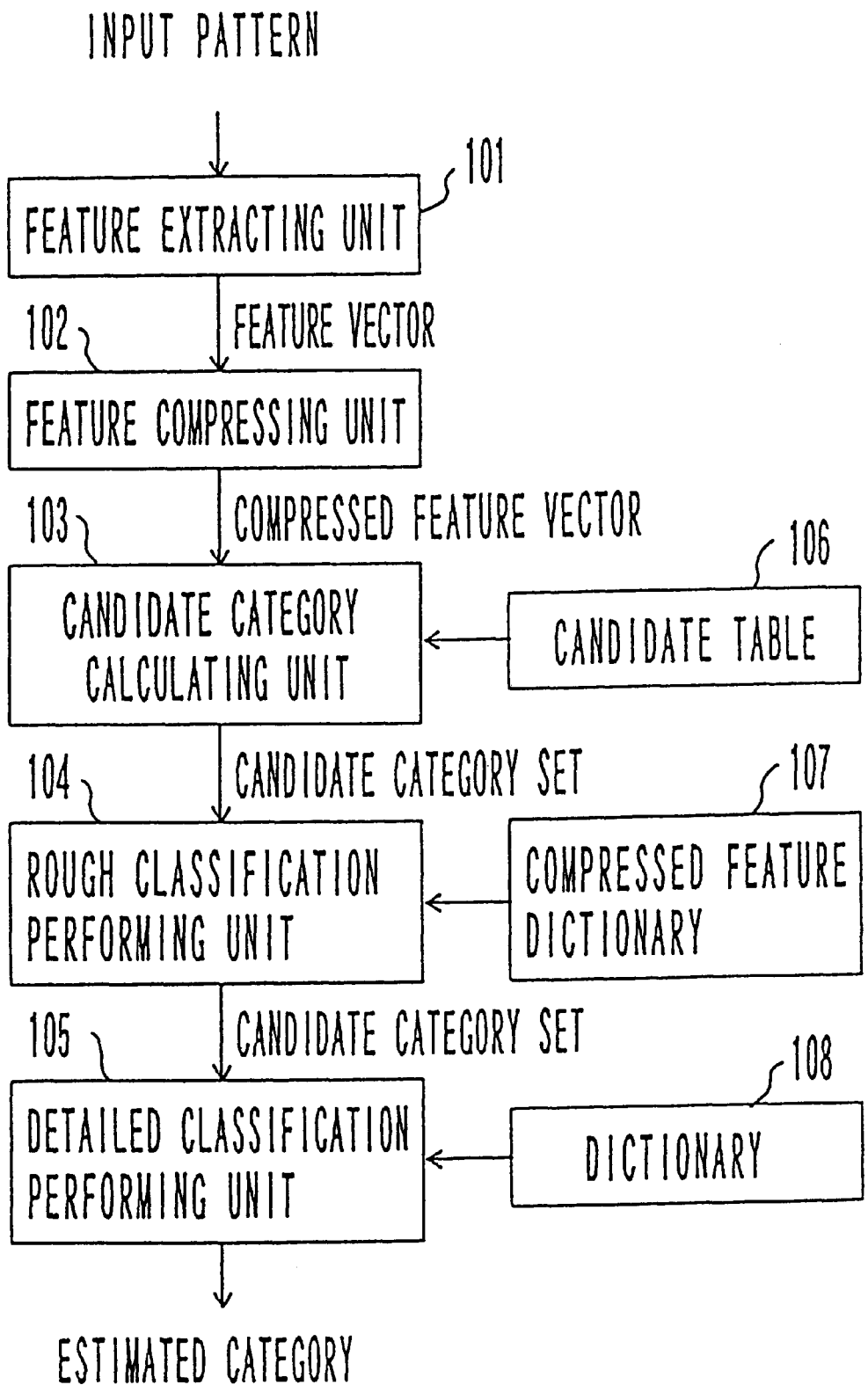
FIG. 22 is a schematic diagram showing the configuration of a sixth pattern recognition device.

FIG. 22 is a schematic diagram showing the configuration of the sixth pattern recognition device for obtaining a candidate category set by using a compressed feature vector as a reference feature vector, and performing rough and detailed classifications. The pattern recognition device shown in FIG. 22 comprises a feature extracting unit 101, feature compressing unit 102, candidate category calculating unit 103, rough classification performing unit 104, detailed classification performing unit 105, candidate table 106, compressed feature dictionary 107, and a dictionary 108.

The capabilities of the feature extracting unit 101, feature compressing unit 102, candidate category calculating unit 103, and the candidate table 106 are similar to those of the feature extracting unit 91, feature compressing unit 92, candidate category calculating unit 93, and the candidate table 95, which are shown in FIG. 21.

The rough classification performing unit 104 calculates the distance between a compressed feature vector stored in the compressed feature dictionary 107 and a compressed feature vector of an input pattern, for each of the candidate categories in a candidate category set output from the candidate category calculating unit 103. The rough classification performing unit 104 sorts the candidate categories in ascending order of distance, and outputs a sequence of categories by a specified number from the category whose distance is the shortest, as a candidate category set.

The detailed classification performing unit 105 calculates the distance between a representative feature vector stored in the dictionary 108 and a feature vector of the input pattern, for each of the candidate categories in a candidate category set output from the rough classification performing unit 104. The detailed classification performing unit 105 then sorts the candidate categories in ascending order of distance, and outputs a sequence of categories by a specified number from the category whose distance is the shortest.

With such a pattern recognition device, the rough classification performing unit 104 screens a candidate category set output from the candidate category calculating unit 103, and passes the screened set to the detailed classification performing unit 105. As a result, candidate categories to be targeted for detailed classification are further limited, thereby improving the processing speed.

According to the pattern recognition devices shown in FIGS. 21 and 22, a compressed feature vector is used as a reference feature vector unchanged. However, a partial feature vector of the compressed feature vector may be used as the reference feature vector. In this case, the number of dimensions of the reference feature vector is further reduced, and the processing speed is improved.

As the transformation for generating a compressed feature vector from a feature vector, linear transformation is available. Since the linear transformation compresses a feature vector by performing a relatively simple calculation, that is, multiplication of a transformation matrix and a vector, its calculation efficiency is higher than that of non-linear transformation. As the method for compressing a feature using the linear transformation, canonical discriminant analysis, principal component analysis etc., are known.

With the canonical discriminant analysis, an inter-category variance matrix and an intra-category variance matrix are calculated from an N-dimensional feature vector of a sample pattern provided for each category, and a proper vector is obtained by using these variance matrices. Then, "M" (M<N) proper vectors are selected, and an M-dimensional space is defined. If an unknown pattern is input, the inner product of its feature vector and each proper vector is calculated, and an M-dimensional compressed feature vector whose element is the calculated result of the inner product is generated.

With this analysis method, an N-dimensional average feature vector is projected on "M" coordinate axes stipulated by "M" proper vectors, so that the inter-category dispersion is made larger and the intra-category dispersion is made smaller. With this process, transformation is performed so that patterns of different types fall apart, and patterns of an identical type draw near in an M-dimensional space after the feature compression.

In the meantime, with the principal component analysis, the combination of principal component vectors is calculated for each category so that each category falls apart. Then, another new space in which the principal component vectors are used as its coordinate axes is generated for each category, and a compressed feature vector is generated by projecting a feature vector of an input pattern on the principal component vectors of each category. The distance between the input pattern and each category is calculated by using the compressed feature vector.

With this analysis method, if a similar category exists in a close region in a feature space, a more accurate recognition result can be obtained by projecting a feature vector of a pattern to be recognized into a principal component vector corresponding to each category. This method is used mainly for recognizing similar character patterns which have few categories.

In the above described embodiment, the distance between vectors must be calculated for the process for generating Voronoï divisions and the processes for performing rough and detailed classifications of candidate categories. At this time, an arbitrary distance can be defined and used in addition to a normal Euclidean distance. For example, well-known distances such as a city block distance, Mahalanobis distance, modified Mahalanobis distance, Bayes discriminant function, modified Bayes discriminant function, etc., may be used.

Here, each distance between a vector $g=(g_1, g_2, \ldots, g_n)$ and a vector $p=(p_1, p_2, \ldots, p_n)$ is defined as follows:

[City Block Distance]

$$D_{CB}(g, p) = \sum_{i=1}^{n} |g_i - p_i|$$

[Mahalanobis Distance]

$$D_m(g, p) = (g - p)^T \sum_j^{-1} (g - p)$$

where "p" is an average of learning patterns "$p_i$"s (i=1, 2, ..., N) of a particular category, and is a covariance matrix (also referred to as a variance matrix) defined by the following equation:

$$\Sigma_j = (1/N)\Sigma(p_i-p)(p_i-p)$$

Assuming that the proper values of $\Sigma_j$ are $\lambda_1, \lambda_2, \ldots, \lambda_n$ ($\lambda_1 > \lambda_2 > \ldots > \lambda_n$), the corresponding proper vectors are respectively $\phi_1, \phi_2, \ldots, \phi_n$, and $\Phi = (\phi_1, \phi_2, \ldots, \phi_n)$, $D_m(g,p)$ can be represented as follows:

$$D_m^z(g, p) = (\Phi^T(g-p))^T \begin{bmatrix} 1/\lambda_1 & & 0 \\ & \ddots & \\ 0 & & 1/\lambda_n \end{bmatrix} \Phi^T(g-p)$$

$$= \sum_{i=1}^{n} \frac{((\phi^T(g-p))^2}{\lambda_i}$$

[Modified Mahalanobis Distance]

$$D_m^2(g, p) = \sum_{i=1}^{n} \frac{(\phi^T(g-p))^2}{\lambda_i}$$

Note that $\lambda_i = \lambda$ (constant) (m<<n, m+1 ≤ i ≤ n)

The modified Mahalanobis distance was proposed to overcome the practical problem of the Mahalanobis distance (calculation amount and accuracy), and based on the concept of the modified Bayes discriminant function to be described later.

[Bayes Discriminant Function]

$$f(g) = (g-p)^T \Sigma^{-1}(g-p) + \ln|\Sigma|$$

The Bayes discriminant function (secondary discriminant function) represents the distance between the vectors "g" and "p". It will become an optimum discriminant function if a target is distributed according to a normal distribution, and the average of feature vectors and a covariance matrix are known.

[Modified Bayes Discriminant Function]

$$f_2(g) = \sum_{i=1}^{k} \frac{\{\Phi_i^T(g-p)\}^2}{\lambda_i} + \sum_{i=k+1}^{n} \frac{\{\Phi_i^T(g-p)\}^2}{\lambda_{k+1}} + \ln\left(\prod_{i=1}^{k} \lambda_i \cdot \prod_{i=k+1}^{n} \lambda_{k+1}\right)$$

The modified Bayes Discriminant Function is a function designed to overcome the problem of calculation accuracy of a high-dimensional proper vector when a complicated character pattern etc., is discriminated.

These distances are based on the assumption that a category feature set is distributed according to a normal distribution, and the appearance probability of each category is the same. If covariance matrices of distributions of respective categories are the same, detailed classification is performed based on the Mahalanobis distance or the modified Mahalanobis distance. If they are different, that is, they are general, detailed classification is performed based on the modified Bayes discriminant function.

The present invention can be applied not only to character patterns, but also to a technology for recognizing an arbitrary pattern such as a two-dimensional figure, three-dimensional object, and an image of a human face.

According to the present invention, use of a candidate table in a process for recognizing an arbitrary pattern allows the degradation of a recognition accuracy to be suppressed to a minimum, and a category classification to be made faster. Especially, if a candidate table is generated based on divisions similar to categories registered to a dictionary for detailed classification, it is possible to prevent the accuracy of detailed classification from degrading.

What is claimed is:

1. A pattern recognition device, comprising:
   a table storing unit storing a candidate table which includes corresponding combinations of first and second elements, the first element representing a reference feature dividing element which is a subset obtained by dividing a reference feature space composed of a set of values of reference feature vectors into two or more, the reference feature vector calculated from a feature vector of a pattern, the second element representing a candidate category set;
   a candidate category calculating unit screening the candidate category set prior to performing a detailed classification by calculating a value of a reference feature vector mapped to the candidate category set; and
   a detailed classification performing unit performing the detailed classification by comparing a representative feature of each candidate category included in the candidate category set calculated by the candidate category calculating unit with the feature vector of the pattern, and outputting at least the candidate category which is closest.

2. The pattern recognition device according to claim 1, further comprising a reference feature vector calculating unit calculating the reference feature vector from the feature vector of the pattern.

3. The pattern recognition device according to claim 2, wherein said reference feature vector calculating unit outputs one or more partial feature vectors of the feature vector of the pattern, as one or more reference feature vectors.

4. The pattern recognition device according to claim 1, further comprising a feature extracting unit generating the feature vector of the pattern from an input pattern.

5. The pattern recognition device according to claim 1, wherein the reference feature dividing element is obtained by dividing the reference feature space in a gridlike fashion.

6. The pattern recognition device according to claim 1, wherein the candidate table is generated by estimating a range of a projection of a set of feature vectors corresponding to each category into the reference feature space, and using the obtained estimated value.

7. The pattern recognition device according to claim 6, wherein said candidate table is generated by using a category corresponding to the estimated value as an element of the candidate category set corresponding to the reference feature dividing element, when the reference feature dividing element and the estimated value share a portion.

8. The pattern recognition device according to claim 6, wherein said candidate table is generated by obtaining minimum and maximum values of a one-dimensional reference feature vector as estimated values of a projection into a one-dimensional reference feature space corresponding to each category.

9. The pattern recognition device according to claim 6, wherein said candidate table is generated based on the estimated value obtained by using a linear programming method.

10. The pattern recognition device according to claim 6, wherein said candidate table is generated based on the estimated value obtained by using a nonlinear programming method.

11. The pattern recognition device according to claim 6, wherein the candidate table is generated based on the estimated value obtained by using a distribution of values of the reference feature vector obtained from a pattern set for learning.

12. The pattern recognition device according to claim 6, wherein said candidate table is generated based on the estimated value obtained by projecting a Voronoï dividing element in a feature space, which is based on a representative feature vector of each category registered to a dictionary, into the reference feature space.

13. A pattern recognition method, comprising:
   obtaining a reference feature dividing element including a value of a given reference feature vector;
   obtaining a combination having the obtained reference feature dividing element as the first element from a candidate table which includes combinations of first and second elements, the first element representing the reference feature dividing element which is a subset obtained by dividing a reference feature space composed of a set of values of reference feature vectors into two or more, the reference feature vector calculated from a feature vector of a pattern, and the second element representing a candidate category;
   screening the candidate category set prior to performing a detailed classification by calculating a value of a reference feature vector mapped to the candidate category set;
   performing the detailed classification by comparing a representative feature of each candidate category included in the candidate category set with the feature vector of the pattern; and
   outputting at least the candidate category which is closest.

14. A pattern recognition device, comprising:
   a table storing unit storing a candidate table which includes combinations of first and second elements, the first element representing a reference feature dividing element which is a subset obtained by dividing a reference feature space composed of a set of values of reference feature vectors into two or more, the reference feature vector calculated from a feature vector of a pattern, the second element representing a candidate category set;
   a candidate category obtaining unit obtaining a reference feature dividing element including a value of a given reference feature vector, obtaining a combination having the obtained reference feature dividing element as the first element from the candidate table, obtaining a candidate category set as the corresponding second element in the obtained combination, and outputting the obtained candidate category set;
   a dictionary storing unit for storing a detailed classification dictionary to which a representative feature vector of each category is registered; and a detailed classification performing unit obtaining a representative feature vector of each candidate category included in the candidate category set obtained by said candidate category obtaining unit using the detailed classification dictionary, obtaining a distance between the representative feature vector of each candidate category and the feature vector of the pattern, and outputting a predetermined number of candidate categories in ascending order of the distance.

15. The pattern recognition device according to claim 1, further comprising:

a feature compressing unit performing a predetermined transformation for the feature vector of the pattern, and generating a compressed feature vector in a lower dimension, wherein said candidate category obtaining unit obtains the candidate category set using a value of the reference feature vector calculated from a value of a given compressed feature vector.

16. The pattern recognition device according to claim 15, wherein said candidate category obtaining unit uses a partial feature vector of the compressed feature vector as the reference feature vector.

17. A pattern recognition device, comprising:

a table storing unit storing a candidate table which includes combinations of first and second elements, the first element representing a reference feature dividing element which is a subset obtained by dividing a reference feature space composed of a set of values of reference feature vectors into two or more, the reference feature vector calculated from a feature vector of a pattern, the second element representing a candidate category set;

a candidate category obtaining unit obtaining a reference feature dividing element including a value of a given reference feature vector, obtaining a combination having the obtained reference feature dividing element as the first element from the candidate table, obtaining a candidate category set as the corresponding second element in the obtained combination, and outputting the obtained candidate category set;

a feature compressing unit performing a predetermined transformation for the feature vector of the pattern, and generating a compressed feature vector in a lower dimension, wherein said candidate category obtaining unit obtains the candidate category set using a value of the reference feature vector calculated from a value of a given compressed feature vector;

a dictionary storing unit storing a compressed feature dictionary to which a compressed feature vector of each category is registered; and a rough classification performing unit obtaining a compressed feature vector of each candidate category included in the candidate category set obtained by said candidate category obtaining unit using the compressed feature dictionary, obtaining a distance between the compressed feature vector of each candidate category and the compressed feature vector output from said feature compressing unit, and outputting a predetermined number of candidate categories in ascending order of the distance.

18. The pattern recognition device according to claim 17, wherein said rough classification performing unit uses one of a Euclidean distance, a city block distance, a Mahalanobis distance, a modified Mahalanobis distance, a Bayes discriminant function, and a modified Bayes discriminant function, as a definition of the distance.

19. The pattern recognition device according to claim 17, further comprising:

a dictionary storing unit storing a detailed classification dictionary to which a representative feature vector of each category is registered; and a detailed classification performing unit obtaining a representative feature vector of each candidate category output from said rough classification performing unit by using the detailed classification dictionary, obtaining a distance between the representative feature vector of each candidate category and the feature vector of the pattern, and outputting a predetermined number of candidate categories in ascending order of the distance.

20. The pattern recognition device according to claim 19, wherein said detailed classification performing unit uses one of a Euclidean distance, a city block distance, a Mahalanobis distance, a modified Mahalanobis distance, a Bayes discriminant function, and a modified Bayes discriminant function, as a definition of the distance.

21. The pattern recognition device according to claim 15, wherein said feature compressing unit generates the compressed feature vector using linear transformation.

22. The pattern recognition device according to claim 21, wherein said feature compressing unit obtains the linear transformation by using a principal component analysis in a feature space.

23. The pattern recognition device according to claim 21, wherein said feature compressing unit obtains the linear transformation by using a canonical discriminant analysis in a feature space.

24. The pattern recognition device according to claim 1, wherein the pattern corresponds to at least one type of information among a character, human face, three-dimensional object, and a two-dimensional figure.

25. A pattern recognition device, comprising:

a plurality of table storing units respectively storing a candidate table which includes corresponding combinations of first and second elements, the first element representing a reference feature dividing element which is a subset obtained by dividing a reference feature space composed of a set of values of reference feature vectors into two or more, a reference feature vector calculated from a feature vector of a pattern, the second element representing a candidate category set;

a plurality of candidate category calculating units, which are respectively arranged for said plurality of table storing units, respectively screening the candidate category set prior to performing a detailed classification by calculating a value of a reference feature vector mapped to the candidate category set;

a category screening unit screening a plurality of candidate category sets output from said plurality of candidate category calculating units, and outputting a result of screening; and a detailed classification performing unit performing the detailed classification by comparing a representative feature of each candidate category included in the candidate category set calculated by the candidate category calculating unit with the feature vector of the pattern, and outputting at least the candidate category which is closest.

26. The pattern recognition device according to claim 25, wherein said category screening unit calculates a logical product of the plurality of candidate category sets, and screens the plurality of candidate category sets.

27. A pattern recognition device, comprising:

a storing unit storing a candidate table which includes corresponding combinations of first and second elements, the first element representing feature amount data indicating a feature of a pattern, the second element representing a candidate category set;

a candidate category obtaining unit obtaining a combination having a value of a given feature amount data as the first element from the candidate table;

a candidate category calculating unit screening the candidate category set prior to performing a detailed classification by calculating a value of a reference feature vector mapped to the candidate category set; and a detailed classification performing unit performing the detailed classification by comparing a representative feature of each candidate category included in the candidate category set calculated by the candidate category calculating unit with the feature vector of the pattern, and outputting at least the candidate category which is closest.

28. A computer-readable storage medium encoded with processing instructions to implement a method of pattern recognition with a computer, the method comprising:

storing a candidate table which includes corresponding combinations of first and second elements, the first element having a reference feature dividing element including a value of a given reference feature vector, the first element representing the reference feature dividing element which is a subset obtained by dividing a reference feature space composed of a set of values of reference feature vectors into two or more, the reference feature vector calculated from a feature vector of a pattern, and the second element representing a candidate category set;

screening the candidate category set prior to performing a detailed classification by calculating a value of a reference feature vector mapped to the candidate category set;

performing the detailed classification by comparing a representative feature of each candidate category included in the respective candidate category set with the feature vector of the pattern; and outputting at least the candidate category which is closest.

29. A computer-readable storage medium encoded with processing instructions to implement a method of pattern recognition with a computer, the method comprising:

storing a candidate table which includes corresponding combinations of first and second elements, the first element having a value of a given feature amount data as a first element from a candidate table which includes combinations of first and second elements, the first element representing feature amount data indicating a feature of a pattern, the second element representing a candidate category set;

screening the candidate category set prior to performing a detailed classification by calculating a value of a reference feature vector mapped to the candidate category set;

performing the detailed classification by comparing a representative feature of each candidate category included in the respective candidate category set with the feature vector of the pattern; and outputting at least the candidate category which is closest.

30. A pattern recognition method, comprising:

obtaining a combination having a value of a given feature amount data as a first element from a candidate table which includes combinations of first and second elements, the first element representing feature amount data indicating a feature of a pattern, the second element representing a candidate category set;

screening the candidate category set prior to performing a detailed classification by calculating a value of a reference feature vector mapped to the candidate category set;

performing the detailed classification by comparing a representative feature of each candidate category included in the candidate category set with the feature vector of the pattern; and outputting at least the candidate category which is closest.

31. A pattern recognition device, comprising:

a first table storing unit storing a first candidate table which includes combinations of first and second elements, the first element representing a reference feature dividing element which is a subset obtained by dividing a reference feature space composed of a set of values of first type reference feature vectors into two or more, the first-type reference feature vector calculated from a feature vector of a pattern, and the second element representing a candidate category set;

a first candidate category obtaining unit obtaining a reference feature dividing element including a value of a given first-type reference feature vector, obtaining a combination having the obtained reference feature dividing element as the first element from the first candidate table, obtaining a first candidate category set as the corresponding second element in the obtained combination, and outputting the first candidate category set;

a second table storing unit storing a second candidate table which includes combinations of third and fourth elements, the third element representing a reference feature dividing element which is a subset obtained by dividing a reference feature space composed of a set of values of second-type reference feature vectors into two or more, the second-type reference feature vector calculated from the feature vector of the pattern, and the fourth element representing a candidate category set;

a second candidate category obtained unit obtaining a reference feature dividing element including a value of a given second-type reference feature vector, obtaining a combination having the obtained reference feature dividing element as the third element from the second candidate table, obtaining a second candidate category set as the corresponding fourth element in the obtained combination, and outputting the second candidate category set; and a category screening unit screening the first and second candidate category sets output from said first and second candidate category obtaining units, and outputting a result of screening.

32. The pattern recognition device according to claim 31, wherein said category screening unit calculates a logical product of the first and second candidate category sets, and outputs the logical product as the result of screening.

* * * * *